(12) United States Patent
Hiraishi et al.

(10) Patent No.: US 6,909,480 B2
(45) Date of Patent: Jun. 21, 2005

(54) ANISOTROPIC SCATTERING SHEET AND ITS USE

(75) Inventors: Masanori Hiraishi, Osaka (JP); Masanari Ohnishi, Himeji (JP)

(73) Assignee: Daicel Chemical Industries, Ltd., Sakai (JP)

(*) Notice: Subject to any disclaimer, the term of this patent is extended or adjusted under 35 U.S.C. 154(b) by 0 days.

(21) Appl. No.: 10/168,102

(22) PCT Filed: Oct. 18, 2001

(86) PCT No.: PCT/JP01/09134

§ 371 (c)(1),
(2), (4) Date: Jun. 13, 2002

(87) PCT Pub. No.: WO02/33450

PCT Pub. Date: Apr. 25, 2002

(65) Prior Publication Data

US 2003/0002153 A1 Jan. 2, 2003

(30) Foreign Application Priority Data

Oct. 19, 2000 (JP) .................................... 2000-319938
Oct. 25, 2000 (JP) .................................... 2000-326005
Oct. 16, 2001 (JP) .................................... 2001-318256
Oct. 16, 2001 (JP) .................................... 2001-318257

(51) Int. Cl.[7] .......................... G02F 1/1335; C09K 19/00
(52) U.S. Cl. .......................... 349/112; 349/113; 428/1.1
(58) Field of Search ........................ 349/112, 113; 428/1.1

(56) References Cited

U.S. PATENT DOCUMENTS 5,889,570 A * 3/1999 Mitsui et al. ............... 349/113
6,517,914 B1 * 2/2003 Hiraishi ..................... 428/1.1

FOREIGN PATENT DOCUMENTS

| JP | 4-314522 A | 11/1992 |
| JP | 7-114013 A | 5/1995 |
| JP | 8-146417 A | 6/1996 |
| JP | 8-327805 A | 12/1996 |
| JP | 11-2706 A | 1/1999 |
| JP | 11-84357 A | 3/1999 |
| JP | 11-84376 A | 3/1999 |
| JP | 11-231111 A | 8/1999 |
| JP | 11-231315 A | 8/1999 |
| JP | 2001-249205 A | 9/2001 |

* cited by examiner

Primary Examiner—Tarifur R. Chowdhury
Assistant Examiner—Jeanne Andrea Di Grazio
(74) Attorney, Agent, or Firm—Birch, Stewart, Kolasch & Birch, LLP

(57) ABSTRACT

An anisotropic scattering sheet is adapted to scatter an incident light in a light-advancing direction and has a light-scattering characteristic $F(\theta)$ that satisfies the following expression representing a relation between a light-scattering angle $\theta$ and a scattered light intensity F over a range of $\theta=4$ to $30°$: $Fy(\theta)/Fx(\theta)>2$, wherein $Fx(\theta)$ represents the light-scattering characteristic in a direction of a X-axis and $Fy(\theta)$ represents a light-scattering characteristic in a Y-axial direction which is perpendicular to the X-axial direction.

27 Claims, 7 Drawing Sheets

ANISOTROPIC SCATTERING SHEET AND ITS USE

This application is the national phase under 35 U.S.C. § 371 of PCT International Application No. PCT/JP01/09134 which has an International filing date of Oct. 18, 2001, which designated the United States of America.

TECHNICAL FIELD

The present invention relates to an anisotropic scattering or diffusing sheet which is capable of illuminating a display unit of a display apparatus (in particular, a transmittable (transmission type) liquid crystal display apparatus) uniformly and inhibiting a change of the luminance even when a visual angle on or to a display surface changes, a plane light source unit using the sheet (a backlight unit or device), and a display apparatus using the unit (particularly, a transmittable display apparatus such as a transmittable liquid crystal display apparatus). Specifically, the present invention relates to an anisotropic scattering or diffusing sheet which is capable of inhibiting a change of the luminance even when a visual angle somewhat changes in the across direction (horizontal direction) on a display surface of a transmittable liquid crystal display apparatus and being employed without effecting eyestrain, a transmittable liquid crystal display apparatus using the sheet, and a plane light source device thereof.

BACKGROUND ART

In a backlight type display apparatus (a liquid crystal display apparatus) illuminating a display panel (e.g., a liquid crystal display module) from its backside, a flat or plane light source unit (or a backlight unit) is disposed on the backside of the display panel. The plane light source unit comprises, for example, a tubular light source such as fluorescent tube (cold cathode tube) disposed adjacent to a lateral side of a light guide, the light guide for guiding a light from the tubular light source to a display panel, and a reflector disposed opposite to the display panel side of the light guide. In such a plane light source unit, since a light from a fluorescent tube is reflected by the reflector and guided by a light guide, a diffusing or scattering film is usually disposed between the tubular light source and the display panel for uniformly illuminating the display panel from behind. As the diffusing film, a transparent and highly heat-resistant polycarbonate film or a polyester film each comprising dispersed resin microfine particles (resin beads) or light-transmissive inorganic microfine particles is employed. However, even when such a diffusing film is used, it is inevitable due to its isotropy of light diffusing that the luminance in a certain direction (the axis-direction of the fluorescent tube) is unduly lowered. As a result, it is unable to illuminate the display panel uniformly with the high luminance.

Therefore, in Japanese Patent Application Laid-Open No. 231315/1999 (JP-11-231315A), 84357/1999 (JP-11-84357A) and 84376/1999 (JP-11-84376A), an optical element such as a prismatic lens is interposed between the diffusing film (diffuser) and the liquid crystal layer to thereby refract the diffused light so that the light will be incident perpendicularly on the liquid crystal display surface, thus upholding the luminance.

More specifically, Japanese Patent Application Laid-Open No. 231315/1999 (JP-11-231315A) discloses a plane light source unit comprising a linear light source such as a fluorescent tube, a light guide on which a light from the linear light source is incident from the lateral side, a diffusion reflector disposed adjacently to the bottom surface of the light guide, a reflecting mean composed of concavity/convex formed on the bottom surface of the light guide (e.g., a prismatic system).

Japanese Patent Application Laid-Open No. 84357/1999 (JP-11-84357A) discloses a liquid crystal display apparatus comprising a backlight unit, a liquid crystal display panel disposed on the unit, a first lens sheet interposed between the backlight unit and the liquid crystal display panel, and a change or switching means for changing the first lens sheet to a second lens sheet. The literature also describes a technology that a light from a fluorescent tube is guided from the lateral side of the light guide to an emerging surface, a light from the emerging surface is focused by a lens sheet in which a plurality of triangle-shaped sectional prisms are formed in parallel with each other, thereby a display panel is illuminated.

Such a device or unit enables to focus the diffused light with use of a prism for illuminating the display panel with the high luminance. However, an uneven emission (luminance) distribution in the direction perpendicular relative to the longitudinal direction of the fluorescent tube is inevitable, causing a streak pattern to appear, although the emission distribution in the longitudinal direction of the fluorescent tube is uniform. Therefore, it is difficult to illuminate the display panel uniformly.

Japanese Patent Application Laid-Open No. 84376/1999 (JP-11-84376A) discloses, as a unit for illuminating a transmittable liquid crystal display panel with uniform luminance, a backlight unit comprising a light guide for guiding a projected light to the display panel, a fluorescent lamp disposed in proximity to one side of the light guide, a reflector for reflecting a light from the fluorescent lamp toward a front direction (a direction of a display panel), a diffusion plate (diffuser) for diffusing a emerge light from an emerging surface of the light guide to be uniformed, which is disposed on the front side of the light guide, and a prism sheet for gathering a light from the diffusion plate. The literature describes an example of a unit comprising a pair of prism sheets disposed oppositely with aligning the extended direction of the prisms toward a crossing direction each other, and diffusion plates disposed on both sides of the prism sheets.

Since a plurality of prism sheets and a plurality of diffusers are required for such a backlight unit, its structure is complicated and its luminance is lowered. Moreover, even when the above backlight unit is employed, its luminance distribution is not still uniform. Thus, although an emission distribution (luminance distribution) in the longitudinal direction (X-axis direction) of the fluorescent tube (cold cathode tube) is relatively uniform, the emission distribution (luminance distribution) in the Y-axis direction perpendicular to the X-axis direction of the fluorescent tube has a streak-like directionality (linear dark areas) and is not still uniform.

For example, as a plane or flat display apparatus of which the image display area has a flat surface (a flat type display apparatus), an apparatus as illustrated in FIG. 8 is known. The apparatus comprises a flat display unit (e.g., a transmittable liquid crystal display unit) 45 and a flat light source unit adapted to illuminate the display unit from its back side. The plane or flat light source unit comprises at least one fluorescent discharge tube (cold cathode tube) 41, and a reflector 42 is disposed on the back side of the fluorescent discharged tube 41 for reflecting a light, a diffuser 43 is interposed between the fluorescent discharged tube 41 and a display unit 45 for diffusing the light to uniformly illuminate the display unit 45, and a prism sheet 44 is laminated on the unit side of the diffuser 43. The flat display unit 45, in the case of a liquid crystal display unit, comprises a first polarizing film 46a, a first glass substrate 47a, a first electrode 48a on the glass substrate, a first alignment layer 49a laminated on the electrode, a liquid crystal layer 50, a second alignment layer 49b, a second electrode 48b, a color filter 51, a second glass substrate 47b, and a second polarizing film 46b as successively built up (laminated) in that order. In such a display apparatus, the display unit can be directly illuminated from the back side by the built-in fluorescent tube (cold cathode tube) 41.

Moreover, an apparatus comprises a backlight unit having such a light guide as illustrated in FIG. 9 as the backlight system of the flat display apparatus of FIG. 8 has been known. This backlight unit has a fluorescent tube (cold cathode tube) 51 and a reflector member 55 disposed in parallel with the fluorescent tube, with a light guide 54 having a diffuser 53 at top and a reflector 52 at bottom being disposed in the direction of light emission from the fluorescent tube. Incidentally, the thickness of the light guide 54 at the fluorescent tube side is larger than that of the other side, so that the light from the fluorescent tube 51 can be reflected in a forward direction. The light emerged from the emerging surface of the light guide is diffused by the diffuser 53 and incident on the flat display apparatus (not shown) constructed (laminated) on the diffuser.

When such a backlight unit is used, a display panel can be illuminated by focusing a diffused light with use of a prism sheet, and in contrast to the backlight unit or component of FIG. 8, the emission distribution may appear uniform over the surface but a detailed observation of the emission distribution reveals that the distribution is still not as uniform as desired. Thus, as shown in FIGS. 10 and 11, the emission distribution (luminance distribution) in the longitudinal (axial) direction (X-direction) of the fluorescent tube (cold cathode tube) 51 is relatively uniform as it is the case in the apparatus or device of FIG. 8 but the emission from the fluorescent tube (cold cathode tube) in the Y-direction which is perpendicular to the X-direction is repeatedly reflected by the reflector 52 and advances in the Z-direction (such a direction as the liquid crystal display unit is disposed) which is perpendicular to the XY plane so that the emission distribution (luminance distribution) in the Y-direction is distorted (in a zigzag pattern), thus failing to uniform the luminance distribution.

Thus, in the usual backlight type display apparatus, the emission distribution (luminance distribution) in the direction perpendicular to the longitudinal direction (X-direction) of the fluorescent tube is not uniform and a streak-like directionality (linear dark areas) is produced in the emission distribution. In order to improve in uniformity of the luminance, a diffusing film having an excellent light-diffusing property may be used. However, usually, a diffusing film is scattered an incident light isotropically, and as a scattering angle becomes larger, a scattering intensity decreases greater. Referring to the degree of decrease in the scattering intensity when the scattering angle becomes larger, in the case of a commonly used diffusing film, in about 9° of the half width, the decay (extinction) of the intensity is, for example, $F(0°)/F(18°)$=about 12 and $F(0°)/F(23°)$=about 60, wherein $\theta$ represents the scattering angle, and F represents the scattered light intensity (or the intensity of scattered light), and the decay of the scattering intensity is extreme depending on the angle. Therefore, the intensity of light scattered at 30° or more of the scattering angle is very small.

From such a viewpoint, use of a prism sheet improves the luminance at a scattering angle from the front to 20°. That is, regarding the direction that a prism sheet focuses a light, use of one piece of the prism sheet can make widely the scattering angle to about 18°. However, if the scattering angle is more than 18°, the scattering intensity (luminance) decreases rapidly. In case of the method in which two pieces of the prism sheet is disposed in the direction perpendicular to each other, the luminance of the display apparatus can be uniform isotropically without depending on the angle. However, the angle is not more than about 20° in length and breadth. When the scattering angle is more than 20°, the luminance is deteriorated rapidly in comparison with the luminance in the case of using no prism sheets.

Such display apparatus restricts an angle of vision (visual angle or viewing angle) for a user of the display apparatus, and therefore, the user can not recognize the display of the display surface visually in a wide angle. Thus the display apparatus is inconvenient and effects a sense of fatigue. Therefore, a diffusing sheet, which can scatter a light over a wide range of the angle has investigated. However, in such a diffusing sheet, the luminance is extremely deteriorated. Accordingly, in order to improve in the luminance, a light source having strong emission ability should be used.

Japanese Patent Application Laid-Open No. 314522/1992 (JP-4-314522A) describes an anisotropic light-scattering material comprising a transparent matrix and a transparent substance which is morphologically anisotropic and differing in the index of refraction (the refraction index) from the transparent matrix as uniformly dispersed in the matrix in a positional relation shifted in an orderly and mutually parallel manner. Moreover, the literature discloses the preferred range of the aspect ratio of morphologically anisotropic substance is 15 to 30 and the length of minor axis is 1 to 2 $\mu$m. Specifically, the anisotropic light-scattering material is manufactured by a method which comprises kneading a low-melting low-density polyethylene for the transparent matrix resin with a high-melting polystyrene or a styrene-acrylonitrile copolymer for the transparent substance, extruding the resulting composition, and cooling the molten resin extruded in the form of a sheet under stretching with a large draft in the direction of extrusion. The anisotropic light-scattering material has been used as a lenticular lens for the projection television screen.

Japanese Patent Application Laid-Open No. 114013/1995 (JP-7-114013A) discloses a liquid crystal display apparatus in which a film or a sheet capable of scattering and transmitting an incident light is disposed on a display screen in order to improve in viewing angle properties. The literature discloses a film or a sheet in which a dispersed phase particle composed of a transparent resin and having a ratio of longitudinal axis to minor axis of not less than 10 and an average particle size of 0.5 to 70 $\mu$m is dispersed in a transparent resin matrix.

However, in a display apparatus with the use of a tubular light source having anisotropy in an emission distribution (luminance distribution), it is difficult to illuminate a display panel with uniform luminance even if using these films or sheets.

It is, therefore, an object of the present invention to provide an anisotropic scattering or diffusing sheet which is capable of inhibiting the decrease or deterioration of the luminance depending on an angle relative to a display surface of a transmittable display apparatus (in particular, a transmittable liquid crystal display apparatus) and capable of decreasing an angle dependence on the luminance, a plane or flat light source unit utilizing the sheet, and a transmittable display apparatus utilizing the plane or flat light source unit (a transmittable liquid crystal display apparatus).

It is another object of the present invention to provide an anisotropic scattering or diffusing sheet which is capable of expanding or enlarging a visual angle relative to a display surface and recognizing the display surface visually in the high luminance, a plane or flat light source unit utilizing the sheet, and a transmittable display apparatus utilizing the sheet (a transmittable liquid crystal display apparatus).

It is still another object of the present invention to provide an anisotropic scattering or diffusing sheet which is capable of suppressing the deterioration of the luminance in a certain direction even when an angle relative to a display surface exceeds 20°, a plane or flat light source unit utilizing the sheet, and a transmittable display apparatus utilizing the plane or flat light source unit.

It is further object of the present invention to provide an anisotropic scattering or diffusing sheet which is capable of inhibiting the deterioration of the luminance in spite of using a tubular light source which has an anisotropic emission distribution (luminance distribution) and is useful for illuminating a display panel uniformly, a plane or flat light source unit utilizing the sheet, and a display apparatus comprising the unit (in particular, a liquid crystal display apparatus).

It is still further object of the present invention to provide an anisotropic scattering or diffusing sheet which is capable of simplifying the structure, moreover illuminating a display panel uniformly and visually recognizing a display data clearly or finely, a plane or flat light source unit utilizing the sheet, and a display apparatus utilizing the unit (in particular, a liquid crystal display apparatus).

DISCLOSURE OF INVENTION

The inventors of the present invention did much research to accomplish the above objects and found that: by disposing an anisotropic scattering or diffusing sheet between a light guide member and a display panel, a transmission light through a light-scattering sheet can be scattered anisotropically to illuminate a display panel uniformly; and that use of a film having anisotropic light-scattering property in combination with a prism sheet can inhibit the deterioration of the luminance depending on an angle of a display surface of a transmittable liquid crystal display apparatus (e.g., the luminance of one-direction such as a horizontal direction). The present invention has been developed on the basis of the above findings.

That is, an anisotropic scattering sheet of the present invention is capable of scattering an incident light in the direction of advance thereof (or in light-advancing direction) and having a light-scattering characteristic $F(\theta)$ satisfying the following expression representing the relation between the light-scattering angle $\theta$ and the scattered light intensity F over a range of $\theta=4$ to 30°:

$Fy(\theta)/Fx(\theta)>2$ (for example, $Fy(\theta)/Fx(\theta)>5$).

wherein $Fx(\theta)$ represents the light-scattering characteristic in the direction of the X-axis and $Fy(\theta)$ represents the light-scattering characteristic in the Y-axial direction which is perpendicular to the X-axial direction. Moreover, in the anisotropic scattering sheet, the scattering characteristic $Fx(\theta)$ and scattering characteristic $Fy(\theta)$ may satisfy or fulfill the following expression over a range of $\theta=2$ to 30°:

$Fy(\theta)/Fx(\theta)>5$ (for example, $Fy(\theta)/Fx(\theta)>10$).

Furthermore, the anisotropic scattering sheet may have a light-scattering characteristic $Fy(\theta)$ which is decreased gradually with increasing the light-scattering angle $\theta$ larger and the light-scattering characteristic satisfies the following expression representing the relation between the light-scattering angle $\theta$ and the scattered light intensity F over a range of $\theta=0$ to 30°:

$Fy(0°)/Fy(30°)<200$ (for example, $Fy(0°)/Fy(30°)<50$).

The anisotropic scattering sheet may comprise a continuous phase and a particulate dispersed phase which are different in the index of refraction (or the refractive index) by not less than 0.001 from each other, the mean aspect ratio of the dispersed phase particles is larger than 1 and the major axes of the dispersed phase particles are oriented in the X-axis direction of the film. The mean aspect ratio of the dispersed phase particles may be about 5 to 1,000. The mean dimension of the minor axes of the dispersed phase particles may be about 0.1 to 10 µm. Incidentally, the thickness of the sheet is about 3 to 300 µm and the total light transmittance of the sheet is not less than 85%.

More specifically, the continuous phase may comprise a crystalline resin such as a crystalline polypropylene-series resin. The dispersed phase may comprise at least one non-crystalline resin selected from a noncrystalline copolyester-series resin and a polystyrenic resin. The anisotropic scattering sheet may comprise a compatibilizing agent for the continuous phase and the dispersed phase (for example, an epoxidized diene-series block copolymer such as an epoxidized styrene-butadiene-styrene block copolymer). The ratio of the continuous phase and dispersed phase is [former/latter]=about 99/1 to 50/50 (weight ratio), and the ratio of the dispersed phase and compatibilizing agent is [former/latter]=about 99/1 to 50/50 (weight ratio). The anisotropic scattering sheet may be formed with surface irregularities extending in the direction of the X-axis of the film or the major axis of the dispersed phase.

The plane or flat light source unit of the present invention comprises a tubular light source, a light guide member of which a light from the tubular light source is incident on the lateral side and emerges the light from an emerge surface, and at least one anisotropic scattering sheet which is interposed between the light guide member and a display unit and illuminates the display unit uniformly by the light from tubular light source. In the plane or flat light source unit, the anisotropic scattering sheet comprises an anisotropic scattering sheet having the above-mentioned light-scattering characteristic. Such an anisotropic scattering sheet is composed of a continuous phase and a dispersed phase which differ in the index of refraction (or the refractive index). The plane or flat light source unit may comprise a plurality of anisotropic scattering sheets. The plurality of anisotropic scattering sheets may be interposed between the light guide member and the display unit as they have different light-scattering directionality each other (e.g., in such a direction as the major axes of the dispersed phases is perpendicular to each other). Two anisotropic scattering sheet may be interposed between the light guide member and the display unit in such a direction as the major axes of the dispersed phases is perpendicular to each other.

Moreover, the anisotropic scattering sheet may comprise a continuous phase and a dispersed phase which are different in the index of refraction by not less than 0.001 from each other, the mean aspect ratio of the dispersed phase is larger than 1 and the major axis of the dispersed phase is oriented to the axis-direction of the tubular light source. For instance, when it is assumed that the axis-direction of the tubular light source is X-axial direction, the anisotropic scattering sheet may be disposed in Y-axial direction that a main light-scattering direction of the anisotropic scattering sheet is perpendicular to the axis-direction of the tubular light source.

Furthermore, the plane or flat light source unit of the present invention may comprise an isotropic scattering sheet interposed between the light guide member and the display unit, a prism sheet, and an anisotropic diffusing sheet having the above-mentioned light-scattering characteristic. In the plane or flat light source unit, usually, the tubular light source is disposed in almost parallel with and adjacent to the lateral side of the light guide member, a reflective member, which reflects the light from the tubular light source on the display unit side and is positioned at or on the back of the light guide member, and the anisotropic scattering sheet is disposed between the light guide member and the display unit. The anisotropic scattering sheet can be disposed in the front side of the prism sheet, and when it is assumed that the axis-direction of the tubular light source is X-axial direction, the anisotropic scattering sheet may be disposed in such a direction that a main light-scattering direction thereof is addressed or directed to Y-axial direction.

The display apparatus of the present invention comprises a display unit (e.g., a liquid crystal display unit), and the above-mentioned plane or flat light source for illuminating the display unit. The display apparatus may be a transmittable display apparatus in which the display unit comprises a transmittable unit (e.g., a liquid crystal display unit). In the display apparatus, the anisotropic scattering sheet may be disposed in various directions (e.g., a direction that a main light-scattering direction of the sheet is oriented to the abscissa of the display surface in the display unit).

In the display apparatus comprising such a plane or flat light source unit, the apparatus is capable of inhibiting a change of the luminance even when an angle somewhat changes in the direction to a display surface of the display apparatus, and employing without giving a sense of fatigue. For example, a light which passes through an anisotropic scattering sheet is light-scattered in a direction (Y-axial direction) which is perpendicular to the major axis (e.g., the major axis is regarded as X-axial direction). Therefore, in the case where the anisotropic scattering sheet is disposed in a direction which the longitudinal direction (X-axial direction) of the dispersed phase is oriented or directed to the ordinate on the display surface in the display unit, that is, such a direction as a main light-scattering direction (Y-axial direction) is oriented or directed to the lateral direction (Y-axial direction) of the display surface in the display unit, the sheet is capable of light-scattering in the abscissa (horizontal direction) at a wide range of the angle. As a result, even when the angle from the lateral direction changes, the decrease or deterioration of the luminance can be restricted or inhibited.

Throughout this specification, the term "sheet" is used without regard to thickness, thus meaning a film as well.

BEST MODE FOR CARRYING OUT THE INVENTION

The present invention shall now be described in detail with reference to the attached drawings.

Figure 1:
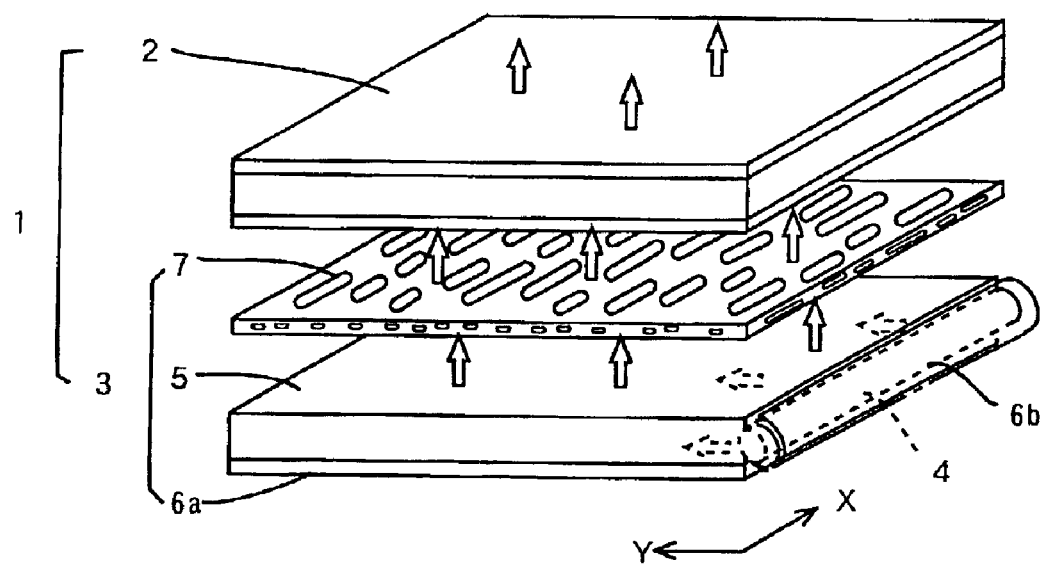
FIG. 1 is a schematic exploded perspective view showing an embodiment of the plane or flat light source unit and the display apparatus of the present invention.
Figure 2:
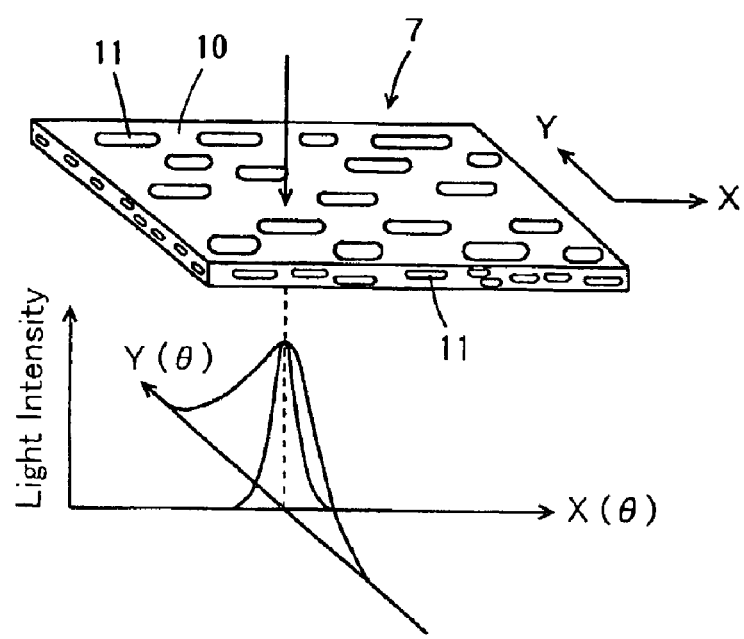
FIG. 2 is a conceptual view illustrating the anisotropic light-scattering property of the anisotropic scattering sheet shown in FIG. 1.

FIG. 1 shows a schematic exploded perspective view of an embodiment of the plane or flat light source unit and the display apparatus of the present invention. FIG. 2 is a conceptual view illustrating the anisotropic scattering property of the anisotropic scattering sheet shown in FIG. 1.

The above-mentioned display apparatus 1 comprises a liquid crystal display unit (or liquid crystal display panel) 2 as a member to be illuminated which is composed of a liquid crystal cell having a liquid crystal sealed therein, and a plane or flat light source unit 3 which is disposed behind the display unit (or panel) and is used for illuminating the display unit 2.

The plane or flat light source unit 3 comprises a tubular light source 4 such as a fluorescent tube (cold cathode tube), and a light guide member (light guide) 5 for being incident a light from the tubular light source from the lateral side thereof and emerging a light from a flat emerge surface. The light from the emerging surface of the light guide member illuminates the display unit 2. Incidentally, the light guide member 5 comprises a light-transmissive plate-like member, and the tubular light source 4 is disposed in almost parallel with and adjacent to the lateral side (or one side) of the light guide member. Furthermore, a reflecting mirror 6b, for reflecting a light of the light source from the lateral side of the light guide member 5, is disposed at the outer lateral side of the tubular light source 4, and a reflecting member or reflecting layer 6a, for reflecting a light from the tubular light source 4 to the front or forward direction (the side of the display unit) to guide the light to the display unit 2, is disposed on or at the back side of the light guide member 5. That is, the plane or flat light source unit comprises a reflector means, which are disposed on or at the lateral side and the back side of the light guide member 5, for reflecting the light from the tubular light source 4 on the lateral side and the emerging side of the light guide member 5.

In such a plane or flat light source unit 3, the luminance distribution of a light emerged from the tubular light source 4 is not uniform and the luminance distribution in the direction perpendicular to the axis-direction of the tubular light source 4 is not uniform. Therefore, even when a light is emerged from the emerge surface through (via) the light guide member 5, it is impossible to illuminate the display unit 2 uniformly.

Therefore, according to the present invention, an anisotropic scattering sheet 7 is disposed between the light guide member 5 and the display unit (panel) 2 to illuminate the display unit 2 uniformly by a light from the tubular light source 4. More specifically, as shown in FIG. 2 for illustrating the relationship between an orientation of a dispersed phase particle and an anisotropic scattering property, the anisotropic scattering sheet 7 is composed of a continuous phase 10 and a dispersed phase 11 which differ in the refractive index (the refraction index) from each other. Each of the continuous phase 10 and the dispersed phase 11 comprises a resin having high transparency. Moreover, the dispersed phase 11 dispersed in the continuous phase 10 has a mean aspect ratio of larger than 1, and scatters an incident light in the direction of advance thereof. That is, the dispersed phase 11 can scatter a transmission light through a film strongly in the direction (Y-direction) perpendicular to the major direction (X-direction) of the dispersed phase particle.

More specifically, in the display apparatus, the anisotropic scattering sheet 7 is disposed with addressing the major axis (X-axis) of the dispersed phase 11 to the longitudinal direction of the tubular light source 4 (axis-direction, X-direction). The Y-axial direction of the film is directed or oriented to the Y-axial direction perpendicular to the longitudinal direction of the tubular light source 4. On the other hand, a light from the tubular light source has uniform emission distribution in the X-axial direction but uneven emission distribution in the Y-axial direction. Moreover, in the case of utilizing the anisotropic scattering sheet 7, whereas the degree of scattering of incident light is small in the direction of the major axis of the dispersed phase 11 (X-axial direction), the degree of scattering is large in the direction perpendicular to the major axis (Y-axial direction). Therefore, the light scattering characteristics $Fx(\theta)$ and $Fy(\theta)$ show the relation of $Fy(\theta) > Fx(\theta)$ as described below. Thus, the sheet scatters an incident light stronger in the Y-axial direction than in the X-axial direction, and even when the tubular light source 4 having uneven luminance distribution and anisotropy is used, the deterioration of the luminance can be inhibited to illuminate the display unit 2 uniformly. Furthermore, since the display unit 2 can be illuminated uniformly only by the intervention of the anisotropic scattering sheet 7, the structures of the plane or flat light source unit 3 and the display apparatus (particularly liquid crystal display apparatus) 1 can be simplified, and the display data of the display unit 2 can be visually recognized clearly or finely.

Incidentally, the scattering sheet may be provided with such a characteristic or property as the scattering intensity shows the maximum in a certain scattering angle $\theta$, that is, the scattering sheet has directionality of the diffused light, as described below.

The plane or flat light source unit and the display apparatus of the present invention need only comprise at least one anisotropic scattering sheet, and may comprise a plurality of anisotropic scattering sheets. If the scattering sheet is disposed, it is unnecessary to align the longitudinal or major direction of the dispersed phase particle (X-axial direction of the film) to the longitudinal direction of the tubular light source (X-axial direction) perfectly, and their directions may be shiftable each other as far as the emission distribution can be uniformalized. The angle between the longitudinal direction of the tubular light source and X-axial direction of the film is about 0 to 20°, and usually about 0 to 10°.

In the case of using a plurality of anisotropic scattering sheets, the longitudinal or major direction of the dispersed phase of each films may be the same or different. For example, the plurality of anisotropic scattering sheets may be disposed in such directions as they have different light-scattering directionality (e.g., the major direction of the dispersed phase) from each other, or the plurality (in particular, two pieces) of anisotropic scattering sheets may be disposed with directing the major directions of the dispersed phases to a direction being perpendicular each other.

The anisotropic scattering sheet may essentially position between the light guide member and the display unit (panel). For example, the sheet may be laminated on the emerging surface (or the front side) of the light guide member and/or the incident surface (or the back side) of the display unit, or interposed (intervened) between the light guide member and the display unit separately. Incidentally, in the display apparatus, the anisotropic scattering sheet may be disposed between the display unit and an observer (e.g., the display surface or front side of the display unit).

Figure 3:
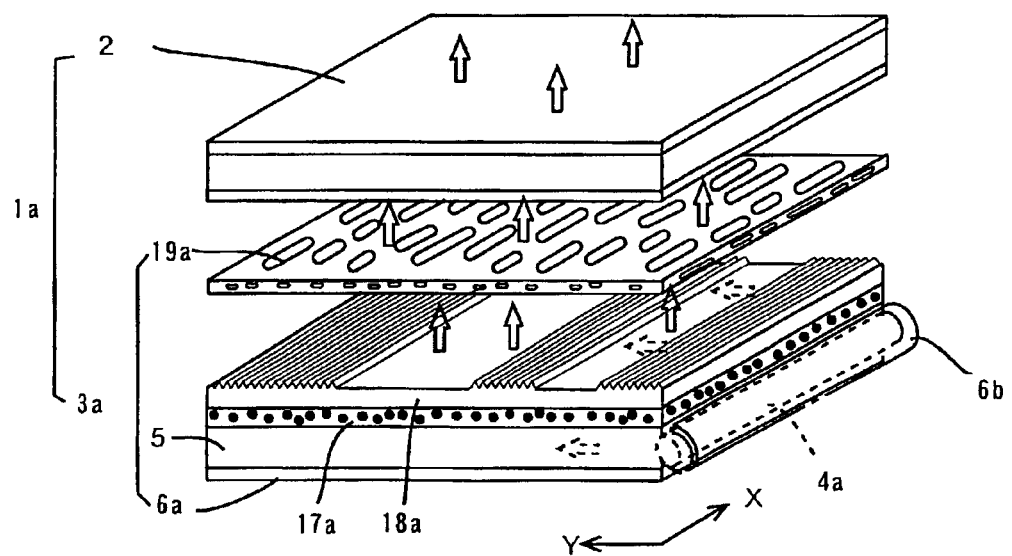
FIG. 3 is a schematic exploded perspective view showing an embodiment of the liquid crystal display apparatus comprising the plane light source unit of the present invention.

FIG. 3 is a schematic exploded perspective view showing another embodiment of the liquid crystal display apparatus comprising the plane or flat light source unit of the present invention. The same reference letters or symbols as the unit shown in FIG. 1 are given to members which have the same functions shown in FIG. 3.

According to the embodiment, in the liquid crystal display apparatus 1a, an isotropic scattering or diffusing sheet 17a, and a prism sheet 18a in which sectional triangular fine prisms are formed in parallel for a given direction are arranged in that order on the emerge surface of the light guide member 5. Therefore, a light from the tubular light source 4a is diffused isotropically by the isotropic scattering sheet 17a through the light guide member 5 to be uniformly, and focused in front by the prism sheet 18a, as a result, the luminance can be improved to illuminate the display unit 2 from the back or reverse side. Moreover, when it is assumed that the axis-direction of the tubular light source 4 is X-axial direction, since an anisotropic scattering sheet 19a, for scattering a light anisotropically, is disposed with addressing the main light-scattering direction to Y-axial direction on the prism sheet 18a, the light focused by the prism sheet 18a is mainly scattered in the Y-axial direction anisotropically rather than in the X-axial direction.

According to the display apparatus having such a structure, the angle dependence of the luminance can be greatly reduced in the Y-axial direction of the display surface. More specifically, as shown in FIG. 2, the anisotropic scattering sheet 19a strongly scatters the transmitted light through the sheet in the direction (Y-axial direction) perpendicular to the longitudinal or major direction of the dispersed phase particle (X-axial direction). Therefore, when the major direction of the dispersed phase of the anisotropic scattering sheet 19a (X-axial direction) is addressed to the vertical direction on the display surface, the sheet scatters a light in the horizontal direction (Y-axial direction) strongly, the deterioration of the luminance can be suppressed even when an angle relative to the horizontal direction on the display surface varies significantly, and the display on the display surface can be visually recognized clearly.

Furthermore, by using the anisotropic scattering sheet 19a, the display unit 2 is illuminated uniformly by a light from the tubular light source 4a, and even when the visual angle on the display surface of the display unit 2 is wider, the display can be recognized visually with the high luminance. That is, as mentioned above, the anisotropic scattering sheet 19a can diffuse an incident light more strongly in the Y-axial direction than in the X-axial direction, and even when the tubular light source 4a having uneven luminance distribution and anisotropy is used, the deterioration of the luminance can be inhibited and the display unit 2 can be illuminated uniformly. Furthermore, since the display unit 2 can be illuminated uniformly only by the intervention of the anisotropic scattering sheet 19a, the structures of the plane or flat light source unit 3a and the display apparatus (particularly liquid crystal display apparatus) 1a can be simplified, and the display data on the display unit 2 can be visually recognized clearly.

Figure 4:
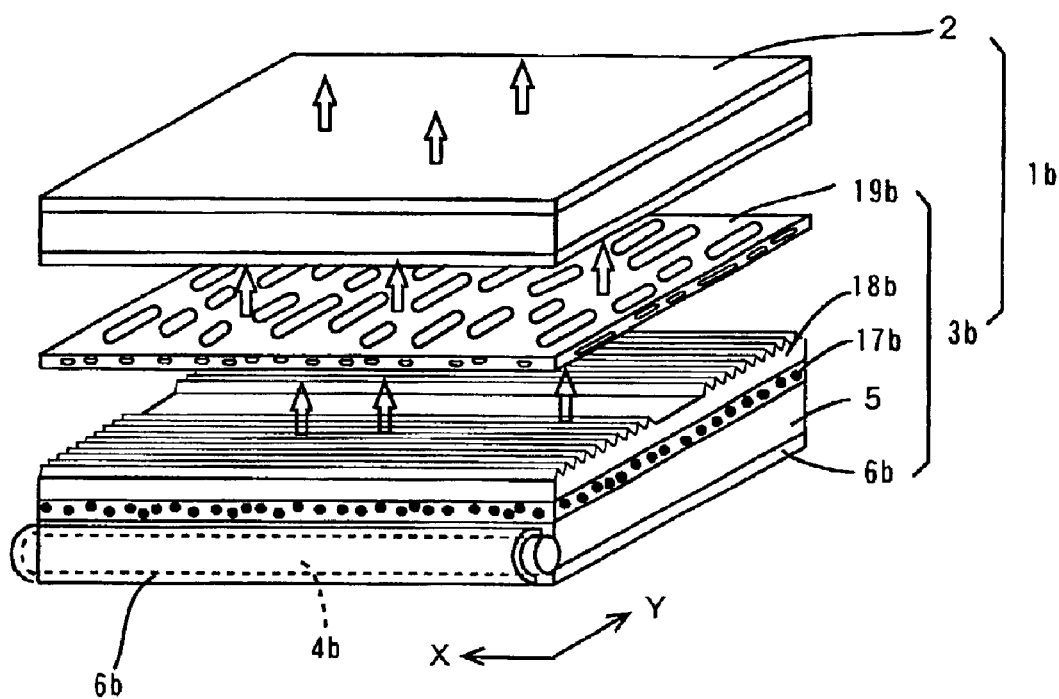
FIG. 4 is a schematic exploded perspective view showing another embodiment of the liquid crystal display apparatus comprising the plane light source unit of the present invention.

FIG. 4 is a schematic exploded perspective view showing still another embodiment of the liquid crystal display apparatus comprising the plane or flat light source unit of the present invention.

According to the embodiment, a plane or flat light source unit 3b of a liquid crystal display apparatus 1b comprises a light guide member 5, and an isotropic scattering or diffusing sheet 17b and a prism sheet 18b which are arranged in that order on the emerging surface of the light guide member, as similar to FIG. 3. Moreover, when it is assumed that the axis-direction of the tubular light source 4b is X-axial direction, an anisotropic scattering sheet 19b for scattering a light anisotropically is disposed on the prism sheet 18b with directing the main light-scattering direction to the horizontal direction of the display unit 2 (X-axial direction). The anisotropic scattering sheet 19b mainly scatters a light focused by the prism sheet 18b anisotropically to the horizontal direction of the display unit 2 (X-axial direction) rather than to the vertical direction thereof (Y-axial direction).

According to the display apparatus having such a structure, even when the tubular light source 4b having uneven luminance distribution and anisotropy is used, the anisotropic scattering sheet 19b scatters a light transmitted through the sheet strongly to the direction (X-axial direction) perpendicular to the longitudinal or major direction of the dispersed phase particle (Y-direction). Therefore, the angle dependence of the luminance can be reduced remarkably in the horizontal direction of the display surface (X-direction), and the display unit 2 can be illuminated uniformly and the display on the display surface can be visually recognized clearly.

Incidentally, the isotropic diffusing sheet, the prism sheet and the anisotropic scattering sheet are interposed essentially between the light guide member and the display unit. The disposing order of the isotropic diffusing sheet, the prism sheet and the anisotropic scattering sheet is not restricted. That is, the anisotropic scattering sheet may be disposed between the light guide member and the display unit. The anisotropic scattering sheet may be disposed or laminated (formed) on any surface of members, for instance, the emerging surface (or the front side) of the light guide of the backlight, the diffusing sheet surface, the prism sheet surface, or the incident surface (or the back surface) of the display unit. The anisotropic scattering sheet may be interposed (intervened) between the light guide member and the display unit separately. The anisotropic scattering sheet is usually disposed on or at the front side of the prism sheet, and preferably disposed or laminated (formed) on the prism sheet. Such a arrangement enables to restrict the deterioration of the luminance at an angle of given direction (in particular, the luminance in one direction) on the display surface of a transmittable liquid crystal display apparatus. Moreover, in the case of disposing the anisotropic scattering sheet on the prism sheet, the anisotropic scattering sheet can also function or serve as a protective film for the sensitive prism sheet with economical advantages.

The direction to be disposed of the anisotropic scattering sheet is not particularly limited, and the sheet can be disposed toward a suitable direction on the display surface of the display unit, for example, a direction in which a main scattering direction is oriented to the vertical direction of the display surface, the horizontal or lateral direction thereof or the inclined direction thereof. According to the preferred plane or flat light source unit, when it is assumed that the axis-direction of the tubular light source is X-axial direction, the anisotropic scattering sheet is disposed with addressing a main light-scattering direction to the Y-axial direction of the tubular light source. In the preferred display apparatus, the anisotropic scattering sheet is disposed toward the horizontal or lateral direction of the display surface of the display unit.

Incidentally, the isotropic diffusing sheet may comprise a continuous phase having high transparency, and a dispersed phase dispersed in the continuous phase having the mean aspect ratio of about 1 and differing from the continuous phase in the refractive index. The continuous phase may be formed with a transparent resin or a glass. The dispersed phase may be formed with a transparent resin or an air bubble. The isotropic diffusing sheet is preferably interposed (intervened) between the light guide member and the prism sheet. If necessary, the isotropic diffusing sheet may be interposed (intervened) between the prism sheet and the anisotropic scattering sheet.

Moreover, the structure (or conformation) of the prism sheet is not particularly restricted, and may comprise a sheet obtained by forming various structure or conformation, for example, uneven lines or rows (or prism lines or rows) composed of an uneven portion (convex portions or groove portions), such as a triangle-shaped section, a trapezoid-shaped section and a sinusoidal-shaped section, on the front and/or back side of a substrate sheet, or comprises a sheet having regularly or randomly scattered uneven portions. The direction to be disposed of the prism sheet relative to the axis-direction (X-axial direction) of the tubular light source is not particularly restricted, and the prism sheet may be disposed so that the extended direction of the prism lines is oriented toward the X-axial direction or the Y-axial direction. Moreover, if necessary, two pieces of prism sheets may be disposed so that the extended directions of the prism lines are oriented toward a crossing direction each other (for example, each sheet disposed toward X-direction and Y-direction).

Furthermore, as the display unit, a variety of display panels can be utilized without limiting to a liquid crystal display unit. The liquid crystal display unit may comprise not only a liquid layer but also various optical members or elements such as a color filter, a polarizing plate (or a polarizing film) and a phase plate. For instance, as the above-mentioned embodiment, the liquid crystal display unit may be formed by laminating a first polarizing film, a first glass substrate, a first electrode on the glass substrate, a first alignment membrane on the electrode, a liquid layer, a second alignment membrane, a second electrode, a color filter, a second glass substrate and a second polarizing film in that order.

Incidentally, the light guide member (light guide) has usually a flat or plane surface (emerging surface) in almost parallel with the display unit. The surface of the reflective layer side may be sloped or inclined downward so that the thickness of the side adjacent to the tubular light source may be larger. As the tubular light source, a fluorescent tube (cold cathode tube) is usually utilized. A single tubular light source or a plurality of the tubular lights may be used.

According to the transmittable liquid crystal display apparatus comprising the plane or flat light source device, the deterioration of the luminance depending on the visual angle on the display surface (e.g., an angle of a given direction such as a horizontal direction) can be inhibited. Usually, in the case where the transmittable liquid crystal display apparatus is used in an office, a user often changes or moves the angle of vision into the lateral direction (horizontal direction) of a display surface thereof. Therefore, in the display unit, when the anisotropic scattering sheet is disposed with directing a main scattering direction of the sheet to the lateral direction (or horizontal direction), a plane or flat light source unit can suppress the change of the luminance on the lateral or horizontal direction of the display surface. Thus, the apparatus can be improved working efficiency of a user (so-called a worker) who utilizes a transmittable liquid crystal display apparatus on a daily life, and the fatigue of the worker can be reduced.

[Anisotropic Scattering Sheet]

The anisotropic scattering sheet is required to be a film which is capable of scattering an incident light in the light-advancing direction and having strong scattering intensity in a given direction (e.g., Y-axial direction) without showing isotropic scattering, and, in addition, having stronger the scattering intensity in the scattering angle than that in a scattering angle in the direction perpendicular to the given direction (X-axial direction) even when the scattering angle in the given direction becomes larger.

In order to uniformalize the luminance distribution and reduce the decrease of the luminance depending on the angle relative to the display surface, the preferred anisotropic scattering sheet scatters mainly an incident light in the direction of advance thereof and has an anisotropic light-scattering characteristic. Thus, in terms of the scattering characteristic $F(\theta)$ showing the relation between the scattering angle $\theta$ and the intensity of scattered light F, the sheet satisfies the following relation formula (1), and preferably relation formula (2):

$$F1=Fy(\theta)/Fx(\theta)>2, \text{ preferably } F1>5(\theta=4 \text{ to } 30°) \quad (1)$$

$$F2=Fy(\theta)/Fx(\theta)>5, \text{ preferably } F2>10(\theta=2 \text{ to } 30°) \quad (2)$$

wherein $Fx(\theta)$ represents the light-scattering characteristic in the direction of the X-axis (e.g., longitudinal or the major direction of the dispersed phase) and $Fy(\theta)$ represents the light-scattering characteristic in the direction of the Y-axis perpendicular to the X-axis (e.g., the minor direction of the dispersed phase).

The value of $F1=Fy(\theta)/Fx(\theta)$ is usually about 5 to 500 (e.g., 10 to 500), preferably about 15 to 500 and more preferably about 50 to 500 (e.g. 100 to 400), and such values apply not only to a scattering angle $\theta$ in the range of 4 to 30° but also to a scattering angle $\theta$ ranging 4 to 15°.

The value of $F2=Fy(\theta)/Fx(\theta)$ is usually about 10 to 500 (e.g., 15 to 500) and preferably about 20 to 500 (e.g. 20 to 400), and such values apply not only to a scattering angle $\theta=4$ to 30° but also to a scattering angle $\theta=4$ to 15°.

The more preferred anisotropic scattering sheet has a light-scattering characteristic $Fy(\theta)$ decreasing gradually with increasing a scattering angle $\theta$ in a scattering angle $\theta$ ranging 0 to 30° (for example, 2 to 30°), and satisfies the light-scattering characteristic represented by the following relation:

$$F3=Fy(0°)/Fy(30°)<200 \quad (3)$$

The value or rate of $F3=(0°)/Fy(30°)$ is usually not more than 150 (e.g., about 10 to 150), preferably not more than 100 (e.g. about 10 to 100), and more preferably not more than 50 (e.g., about 15 to 50).

Incidentally, as described hereinbefore, Japanese Patent Application Laid-Open No. 314522/1992 (JP-4-314522A) describes an anisotropic light-scattering material comprising a transparent resin matrix and a dispersed phase particle which is morphologically anisotropic and is uniformly dispersed in the matrix in a positional relation shifted in an orderly and mutually parallel manner, as a lenticular lens for the projection television screen. However, as described in FIGS. 3 to 6 of the literature, when the light scattering characteristic (intensity) against the scattering angle $\theta$ on a plane perpendicular to the major axes of dispersed particles is represented by $Fy(\theta)$ and the light scattering characteristic (intensity) against the scattering angle $\theta$ on a plane parallel to the major axes of dispersed particles is shown by $Fx(\theta)$, the ratio of $Fy(\theta)$ relative to $Fx(\theta)$ at the scattering angle $\theta=4°$, that it to say the value of $(Fy(4°)/Fx(4°))$, is equal to about 2, and the anisotropic scattering characteristic of the anisotropic light-scattering material is insufficient.

If the anisotropy coefficient F1 expressed by $Fy(\theta)/Fx(\theta)$ is not more than 2 (particularly, not more than 5), no uniform surface emission can be realized when the film is applied to a liquid crystal display apparatus having a tubular projector means (light source).

As described hereinabove, the anisotropic scattering sheet having the light-scattering characteristic scatters a light intensely or extremely in Y-axial direction, assuming that axis direction of the tubular light source is X-axial direction. Therefore, in the case where the anisotropic scattering sheet is disposed with directing the major direction of the dispersed phase therein toward the vertical direction, the sheet scatters a light effectively in the horizontal direction. Thus, even when an angle on the horizontal direction relative to the display surface varies larger, the deterioration of the luminance can be inhibited and the display on the display surface can be visually recognized clearly.

When the scattering characteristic in the $\psi$ direction, which is intermediate between the X-axis and Y-axis directions, is written as $F\psi(\theta)$ (where $\psi$ represents the angle from the X-axis direction; the X-axis direction corresponds to $\psi=0°$ and the Y-axis direction corresponds to $\psi=90°$), the anisotropic scattering sheet need not necessarily have an anisotropy insuring that $F\psi(\theta)$ ($\psi \neq 90°$) will be approximately equal to $Fx(\theta)$ directly, but preferably $F\psi(\theta)$ ($\psi \neq 90°$) may be close to $Fx((\theta)$. Such a film is capable of scattering light with high anisotropy.

Figure 5:
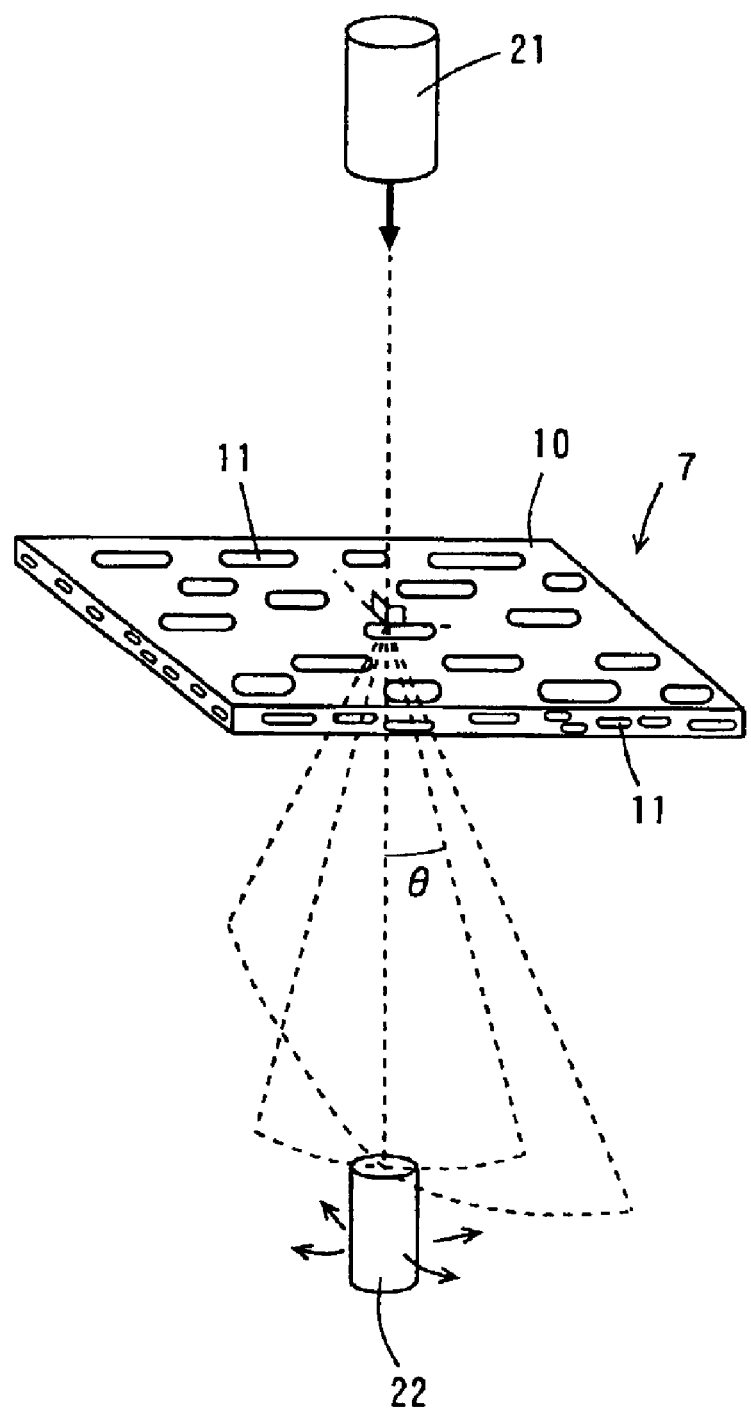
FIG. 5 is a schematic perspective view illustrating the method for measurement of the intensity of scattered light.

The scattering characteristic $F(\theta)$ can be measured using an instrument shown in FIG. 5. This instrument comprises a laser irradiating unit (Nihon Kogaku Eng., NEO-20MS) 21 for projecting a laser light to the anisotropic scattering sheet 9 and a detector 22 for quantitating the intensity of the laser light transmitted through the anisotropic scattering sheet 7. The laser light is emitted at an angle of 90° with respect to (perpendicular to) the anisotropic scattering sheet 9 and the intensity of light diffused by the film (diffusion intensity) F is plotted against the diffusing angle $\theta$, whereby the light-scattering characteristic can be determined.

In the anisotropic scattering sheet, as the anisotropy of the light scattering thereof is higher, the angle dependence of the scattering in a given direction can be lower, therefore, the angle dependence of the luminance can be also lower. In the anisotropic scattering sheet, assuming that the angle which is perpendicular to the display surface is 0°, the luminance can be prevented from decreasing even at the angle of not less than 40°, over that of 20°, on the display surface.

Such a characteristic may be represented by a ratio of the luminance in the angle (θ) relative to the front luminance on the display surface, or by a ratio of the luminances at two angles (θ). That is, the use of the plane or flat light source unit of the present invention makes the value of the above-mentioned rate smaller. For instance, a ratio of the front luminance (N(0°)) at the angle which is perpendicular to the display surface (θ=0°) relative to the luminance at the angle of 18° (N(18°)) or at the angle of 40° (N(40°)), and a ratio of the luminance at the angle of 18° (N(18°)) relative to that at the angle of 40° (N(40°)) can be made smaller. For example, by disposing the anisotropic scattering sheet on a prism sheet of a liquid crystal display apparatus having a conventional structure, a transmittable liquid crystal display apparatus which is suitable for a business monitor satisfying (or meeting) TCO99 standard can be provided.

The anisotropic scattering sheet comprises a continuous phase (such as a resin continuous phase) and a dispersed phase which is dispersed in the continuous phase (such as a particulate or fibrous dispersed phase). The continuous phase and the dispersed phase are different from each other in the refractive index, and are usually incompatible or hardly compatible with each other. The continuous phase and the dispersed phase may be usually formed with a transparent substance.

The resin for constituting the continuous phase and the dispersed phase includes thermoplastic resins [an olefinic resin, a halogen-containing resin (including a fluorine-containing resin), a vinyl alcohol-series resin, a vinyl ester-series resin, a (meth)acrylic resin, a styrenic resin, a polyester-series resin, a polyamide-series resin, a polycarbonate-series resin, a cellulose derivative, etc.] and thermosetting resins (an epoxy resin, an unsaturated polyester resin, a diallyl phthalate resin, a silicone resin, etc.). The preferred resins are the thermoplastic resins.

The olefinic resin includes but is not limited to homo- or copolymers of $C_{2-6}$olefins (ethylenic resins such as polyethylene, ethylene-propylene copolymer, etc., polypropylene-series resins such as polypropylene, propylene-ethylene copolymer, propylene-butene copolymer, etc., poly(methylpentene-1), propylene-methylpentene copolymer, etc.), and copolymers of $C_{2-6}$olefins and copolymerizable monomers (ethylene-(meth)acrylic acid copolymer, ethylene-(meth)acrylate copolymer, etc.).

The halogen-containing resin includes but is not limited to vinyl halide-series resins (e.g. homopolymers of vinyl chloride or fluorine-containing monomers, such as polyvinyl chloride, polytetrafluoroethylene, polychlorotrifluoroethylene, poly(vinyl fluoride), etc., copolymers of vinyl chloride or fluorine-containing monomers, such as tetrafluoroethylene-hexafluoropropylene copolymer, tetrafluoroethylene-perfluoroalkyl vinyl ether copolymers, etc.; and copolymers of vinyl chloride or fluorine-containing monomers and other copolymerizable monomers, such as vinyl chloride-vinyl acetate copolymer, vinyl chloride-(meth)acrylate copolymer, tetrafluoroethylene-ethylene copolymer, etc.), and vinylidene halide-series resins (poly(vinylidene chloride), poly(vinylidene fluoride), copolymers of vinyl chloride or fluorine-containing vinylidene monomers and other monomers).

The derivative of vinyl alcohol-series resin includes polyvinyl alcohol, ethylene-vinyl alcohol copolymers, etc. The vinyl ester-series resin includes homo- or copolymers of vinyl ester-series monomers (e.g. polyvinyl acetate), copolymers of vinyl ester-series monomers and copolymerizable monomers (e.g. vinyl acetate-ethylene copolymer, vinyl acetate-vinyl chloride copolymer, vinyl acetate-(meth)acrylate copolymer, etc.).

The (meth)acrylic resin includes but is not limited to poly(meth)acrylates such as polymethyl(meth)acrylate, methyl methacrylate-(meth)acrylic acid copolymer, methyl methacrylate-(meth)acrylate-(meth)acrylic acid copolymers, methyl methacrylate-(meth)acrylate copolymers, and (meth)acrylate-styrene copolymers (e.g., MS resin). The preferred (meth)acrylic resin includes poly ($C_{1-6}$alkyl (meth)acrylate) and methyl methacrylate-acrylate copolymers.

The styrenic resin includes homo- or copolymers of styrenic monomers (e.g. polystyrene, styrene-α-methylstyrene copolymer, etc.), and copolymers of styrenic monomers and copolymerizable monomers [e.g. styrene-acrylonitrile copolymer (AS resin), styrene-(meth)acrylic ester copolymers (such as styrene-methyl methacrylate copolymer), styrene-anhydrous maleic acid copolymer, etc.].

The polyester-series resin includes aromatic polyesters obtainable from an aromatic dicarboxylic acid, such as terephthalic acid, and an alkylene glycol (homopolyesters, e.g. polyalkylene terephthalates such as polyethylene terephthalate, polypropylene terephthalate, polybutylene terephthalate, etc. and polyalkylene naphthalates such as polyethylene naphthalate, polybutylene naphthalate, etc.; and copolyesters containing an alkylene arylate unit as a main component (e.g. not less than 50 mole %, preferably 75 to 100 mole %, more preferably 80 to 100 mole %)), aliphatic polyesters obtainable by using aliphatic dicarboxylic acids such as adipic acid, and liquid-crystalline polyesters.

The polyamide-series resin includes aliphatic polyamides such as nylon 46, nylon 6, nylon 66, nylon 610, nylon 612, nylon 11, nylon 12, etc. and aromatic polyamides such as xylylenediamine adipate (MXD-6), among others. The polyamide-series resin is not restricted to homopolyamides but may be copolyamides.

The polycarbonate-series resin includes aromatic polycarbonates based on bisphenols (e.g. bisphenol A) and aliphatic polycarbonates such as diethylene glycol bis-aryl carbonates.

The cellulose derivative includes cellulose esters (e.g. cellulose acetate, cellulose propionate, cellulose butyrate, cellulose phthalate, etc.), cellulose carbamates (e.g. cellulose phenylcarbamate), cellulose ethers (e.g. alkylcelluloses, benzylcellulose, hydroxyalkylcelluloses, carboxymethylcellulose, cyanoethylcellulose, etc.).

Where necessary, the resin component may have been modified (e.g. rubber-modified).

It is also possible to form a continuous phase matrix from the resin component and graft- or block-copolymerize the dispersed phase component with this matrix resin. As examples of such polymer, there can be mentioned rubber-block copolymers (e.g. styrene-butadiene copolymer (SB resin)) and rubber-grafted styrenic resins (e.g. acrylonitrile-butadiene-styrene copolymer (ABS resin)).

The fibrous dispersed phase includes organic fiber and inorganic fiber. The organic fiber includes heat-resistant organic fibers such as aramid fiber, fully aromatic polyester fiber, polyimide fiber, etc. The inorganic fiber includes but is not limited to fibrous fillers (e.g. inorganic fibers such as glass fiber, silica fiber, alumina fiber, zirconia fiber, etc.) and flaky fillers (e.g. mica etc.).

The preferred component for making up the continuous phase or the dispersed phase (discontinuous phase or dispersed phase) includes olefinic resins, (meth)acrylic resins, styrenic resins, polyester-series resins, polyamide-series resins and polycarbonate-series resins, among others. Moreover, the resin constituting the continuous phase and/or dispersed phase may be crystalline or noncrystalline, and the continuous phase and dispersed phase may be formed using noncrystalline resins. In the preferred embodiment, a crystalline resin and a noncrystalline resin can be used in combination. Thus, either one (for example, the continuous phase) of the continuous phase and dispersed phase (discontinuous phase) may be made of a crystalline resin and the other one (for example, dispersed phase) of the phases be made of a noncrystalline resin.

The crystalline resin which can be used includes olefinic resins (polypropylene-series resin with a propylene content of not less than 90 mole %, such as polypropylene, propylene-ethylene copolymer, etc., poly(methylpentene-1), etc.), vinylidene-series resins (e.g. vinylidene chloride-series resin), aromatic polyester-series resins (e.g. polyalkylene arylate homopolyesters such as polyalkylene terephthalates, polyalkylene naphthalates, etc., copolyesters containing not less than 80 mole % of an alkylene arylate unit, liquid-crystalline aromatic polyesters, etc.), and polyamide-series resins (e.g. aliphatic polyesters having short-chain segments, such as nylon 46, nylon 6, nylon 66, etc.). These crystalline resins can be used independently or in a combination of two or more species.

The degree of crystallization of the crystalline resin (e.g. a crystalline polypropylene-series resin) may for example be about 10 to 80%, preferably about 20 to 70%, and more preferably about 30 to 60%.

As the resin constituting the continuous phase, usually a highly transparent resin, in particular a highly transparent and highly heat-resistant transparent resin, is used. The preferred continuous phase-forming resin is a crystalline resin having high fluidity as a molten property. The combination of such a resin and the dispersed phase-forming resin contributes to a homogeneous (uniform) compounding with the dispersed phase and improves homogeneity of the compound (uniform dispersability of the dispersed phase). When a resin having a high melting point or glass transition point (particularly a crystalline resin having a high melting point) is used as the continuous phase-forming resin, its high heat stability and good film-forming properties improve a drawing ratio and the film-formation in a melt-molding process. Therefore, the orientation treatment (or monoaxial stretching) to improve the anisotropic scattering characteristic can be carried out at a comparatively high temperature (e.g. about 130 to 150° C.), the processing can be carried out readily, and the dispersed phase can be orientated easily. Furthermore, the film is stable over a broad temperature range (e.g. room temperature to about 80° C.) so that it can be utilized as a component part of a display apparatus or device (liquid crystalline display apparatus or device) with advantage. In addition, crystalline resins (e.g. a crystalline polypropylene resin) are generally inexpensive. The preferred crystalline resin includes a crystalline polypropylene-series resin which is inexpensive and has high heat stability.

The resin constituting the continuous phase may be a resin having a melting point or glass transition temperature of about 130 to 280° C., preferably about 140 to 270° C., and more preferably about 150 to 260° C.

The noncrystalline resin includes but is not limited to vinyl-series polymers (homo- or copolymers of vinyl-series monomers such as ionomers, ethylene-vinyl acetate copolymer, ethylene-(meth)acrylic ester copolymers, polyvinyl chloride, vinyl chloride-vinyl acetate copolymer, poly(vinyl acetate), vinyl alcohol-series resin, etc.), (meth)acrylic resins (e.g. poly(methyl methacrylate), methyl methacrylate-styrene copolymer (MS resin), etc.), styrenic resins (polystyrene, AS resin, styrene-methyl methacrylate copolymer, etc.), polycarbonate-series polymers, noncrystalline polyester-series resins (aliphatic polyesters, polyalkylene arylate copolyesters whose diol component and/or aromatic dicarboxylic acid component has been partially substituted, polyarylate resins, etc.), polyamide-series resins (e.g. aliphatic polyamides having long-chain segments and noncrystalline aromatic polyamides), and thermoplastic elastomers (e.g. polyester elastomers, polyolefin elastomers, polyamide elastomers, styrenic elastomers, etc.). Referring to the noncrystalline polyester-series resins, the polyalkylene arylate copolyester includes copolyesters obtainable by using at least one member selected from (poly)oxyalkylene glycol (e.g. diethylene glycol, triethylene glycol), cyclohexanedimethanol, phthalic acid, isophthalic acid and aliphatic dicarboxylic acids (e.g. adipic acid) as part (e.g. about 10 to 80 mole %, preferably about 20 to 80 mole %, and more preferably about 30 to 75 mole %) of the diol component ($C_{2-4}$alkylene glycol) and/or aromatic dicarboxylic acid component (terephthalic acid, naphthalenedicarboxylic acid). These noncrystalline resins can be used independently or in a combination of two or more species.

As the resin constituting the dispersed phase, a resin being highly transparent, deforming easily at an orientation treatment temperature such as a monoaxial stretching temperature and having practical heat stability is usually employed. In particular, when a resin having a lower melting point or glass transition temperature (or point) than the continuous phase (particularly a noncrystalline resin having a lower melting point or glass transition temperature than a crystalline resin) is used as the resin constituting the dispersed phase, the aspect ratio of dispersed phase particles can be easily increased by an orientation treatment such as monoaxial stretching. Incidentally, the melting point or glass transition temperature of the dispersed phase-forming resin is lower than that of the resin constituting the continuous phase in many instances, and may for example be about 50 to 180° C., preferably about 60 to 170° C., and more preferably about 70 to 150° C.

Among the noncrystalline resins constituting the dispersed phase, at least one resin selected from a noncrystalline copolyester-series resin and a polystyrenic resin is preferred. When the noncrystalline copolyester is used to form the dispersed phase, not only a high degree of transparency can be assured but the glass transition temperature can be about 80° C. so that a deformation can be readily introduced to the dispersed phase at the temperature used for orientation treatment such as monoaxial stretching and the dispersed phase can be kept stable over a given temperature range (for example, room temperature to about 80° C.) after molding. Moreover, the noncrystalline copolyester (e.g. a polyethylene terephthalate copolyester obtainable by using a diol component such as ethyleneglycol/cyclohexanedimethanol=about 10/90 to 60/40 (mole %), preferably about 25/75 to 50/50 (mole %)) has a high index of refraction (e.g. about 1.57) so that the refractive index differential from the continuous phase can be increased. In addition, the noncrystalline copolymer may be compounded with the crystalline resin (such as polypropylene-series resin) effectively.

Since the polystyrenic resin has the high refractive index and the high transparency, and has such a high glass transition temperature as about 100 to 130° C., an anisotropic scattering sheet having excellent heat-resistance can be prepared by using the resin. Moreover, the preferred anisotropic scattering sheet can be prepared by using an inexpensive polystyrenic resin at a comparative small amount relative to the crystalline resin as the continuous phase (e.g., polypropylene-series resin), in addition, at comparative low drawing ratio. Furthermore, the sheet shows extremely high anisotropy in the case of being subjected to calendering after melt molding.

The combination of the crystalline resin forming the continuous phase with the noncrystalline resin forming the dispersed phase includes, for example, the combination of a crystalline polyolefinic resin (e.g. a crystalline polypropylene resin) with at least one member selected from noncrystalline polyesters (e.g., polyalkylene arylate copolyesters such as polyalkylene terephthalate copolyesters) and polystyrenic resins.

The continuous phase and dispersed phase (discontinuous phase or dispersoid) are constituted of components differing from each other in the index of refraction. By using components differing in the index of refraction, the film can be provided with light-diffusing properties. The refractive index differential between the continuous phase and the dispersed phase may for example be not less than 0.001 (e.g. about 0.001 to 0.3), preferably about 0.01 to 0.3, and more preferably about 0.01 to 0.1.

As the combination of resins giving such a defined refractive index differential, the following combinations may be mentioned by way of example.

(1) The combination of an olefinic resin (particularly a propylene-series resin) with at least one member selected from the group consisting of an acrylic resin, a styrenic resin, a polyester-series resin, a polyamide-series resin and a polycarbonate-series resin.

(2) The combination of a styrenic resin with at least one member selected from the group consisting of a polyester-series resin, a polyamide-series resin and a polycarbonate-series resin.

(3) The combination of a polyester-series resin with at least one member selected from the group consisting of a polyamide-series resin and a polycarbonate-series resin.

The anisotropic scattering sheet may contain a compatibilizing agent where necessary. With a compatibilizing agent, the miscibility and mutual affinity of the continuous and dispersed phases can be improved, the formation of defects (voids and other defects) on orientation of the film can be prevented, and the loss of transparency of the film can be prevented. Furthermore, the adhesion between the continuous phase and the dispersed phase can be enhanced so that even when the film is stretched monoaxially, the adhesion of the dispersed phase on the stretching equipment can be decreased.

The compatibilizing agent can be selected from the conventional compatibilizing agents according to the species of continuous and dispersed phases and, for example, modified resins as modified with oxazoline compounds or modifying groups (carboxyl, acid anhydride, epoxy, oxazolinyl and other groups), diene-series copolymers (random and other copolymers) obtainable by copolymerization with diene or rubber-containing polymers [e.g. homo- or copolymers of diene-series monomers or copolymerizable monomers (aromatic vinyl monomers etc.); diene-series graft copolymers such as acrylonitrile-butadiene-styrene copolymer (ABS resin); diene-series block copolymers such as styrene-butadiene (SB) block copolymer, hydrogenated styrene-butadiene (SB) block copolymer, hydrogenated styrene-butadiene-styrene block copolymer (SEBS), hydrogenated (styrene-ethylene/butylene-styrene) block copolymer, etc. and their hydrogenation versions etc.], and diene or rubber-containing polymers modified with the modifying groups (epoxy and other groups). These compatibilizing agents can be used independently or in a combination of two or more species.

As the compatibilizing agent, polymers (a random, block or graft copolymer) having the same components as, or components in common with, the polymer blend constituent resins, or polymers (random, block or graft copolymers) having an affinity for the polymer blend constituent resins are usually employed.

The diene-series monomer includes conjugated dienes such as $C_{4\text{-}20}$ conjugated dienes which may optionally be substituted, e.g. butadiene, isoprene, 1,3-pentadiene, 2,3-dimethyl-1,3-butadiene, piperylene, 3-butyl-1,3-octadiene, phenyl-1,3-butadiene, etc. The conjugated dienes can be used independently or in a combination of two or more species. Among these conjugated dienes, butadiene and isoprene are preferred.

The aromatic vinyl monomer includes but is not limited to styrene, a-methylstyrene, vinyltoluenes (p-methylstyrene etc.), p-t-butylstyrene, divinylbenzenes and 1,1-diphenylstyrene. Among these aromatic vinyl monomers, styrene is preferred. The (meth)acrylic monomer includes alkyl (meth)acrylates [e.g. methyl (meth)acrylate] and (meth)acrylonitrile, among others. As the maleimide-series monomer, maleimide, N-alkylmaleimides, N-phenylmaleimide, etc. can be mentioned. These monomers can be used independently or in a suitable combination of two or more species.

The modification mentioned above can be made by copolymerizing a monomer corresponding to the modifying group (e.g. a carboxyl group-containing monomer such as (meth)acrylic acid for carboxyl-modification, maleic anhydride for acid anhydride-modification, a (meth)acrylic monomer for ester-modification, a maleimide-series monomer for maleimide-modification, and an epoxy group-containing monomer such as glycidyl (meth)acrylate for epoxy-modification). The epoxy-modification may be made by epoxidization of an unsaturated double bond.

The preferred compatibilizing agent is an unmodified or modified diene-series copolymer, particularly a modified block copolymer (e.g. an epoxidized diene-series block copolymer or an epoxy-modified diene-series block copolymer such as epoxidized styrene-butadiene-styrene (SBS) block copolymer). The epoxidized diene-series block copolymer is not only highly transparent but has a comparatively high softening point of about 70° C., and is capable of compatibilizing resins in many combinations of continuous and dispersed phases to disperse the dispersed phase uniformly.

The block copolymer mentioned above can be constituted of a conjugated diene block or the corresponding partially hydrogenated block and an aromatic vinyl block. In the epoxidized diene-series block copolymer, the double bonds in the conjugated diene blocks may have been partly or completely epoxidized.

The ratio (weight ratio) of the aromatic vinyl block relative to the conjugated diene block (or the corresponding hydrogenated block) [former/latter] may for example be about 5/95 to 80/20 (e.g. about 25/75 to 80/20), more preferably about 10/90 to 70/30 (e.g. about 30/70 to 70/30), and usually about 50/50 to 80/20.

The number average molecular weight of the block copolymer can be selected from the range of, for example, about 5,000 to 1,000,000, preferably about 7,000 to 900,000, and still more preferably about 10,000 to 800,000. The molecular weight distribution [the ratio [Mw/Mn] of weight average molecular weight (Mw) relative to number average molecular weight (Mn)] may for example be not more than 10 (about 1 to 10), and preferably about 1 to 5.

The molecular structure of the block copolymer may be linear (straight), branched, radial or any combination thereof. The block structure of the block copolymer may for example be a monoblock structure, a multiblock structure such as a tereblock structure, a trichain-radial tereblock structure or tetrachain-radial tereblock structure. Such block structures may for example be written as X-Y, X-Y-X, Y-X-Y, Y-X-Y-X, X-Y-X-Y, X-Y-X-Y-X, Y-X-Y-X-Y, (X-Y-)$_4$Si, (Y-X-)$_4$Si, etc. where X represents an aromatic diene block and Y represents a conjugated diene block.

The ratio of epoxy groups in the epoxidized diene-series block copolymer is not particularly restricted but, in terms of oxygen concentration of oxirane, may for example be about 0.1 to 8 weight %, preferably about 0.5 to 6 weight %, and more preferably about 1 to 5 weight %. The epoxy equivalent (JIS K7236) of the epoxidized block copolymer may for example be about 300 to 1,000, preferably about 500 to 900, more preferably about 600 to 800.

The epoxidized block copolymer (e.g. epoxidized SBS block copolymer) making up the compatibilizing agent is not only highly transparent but also has a comparatively high softening point (about 70° C.), and is capable of effectively compatibilizing resins in many combinations of continuous and dispersed phases to disperse the dispersed phase resin uniformly. Moreover, the epoxidized block copolymer with an aromatic vinyl block (e.g. styrene block) content of about 60 to 80 weight % has a refractive index which is comparatively high (e.g. about 1.57) and close to the refractive index of the dispersoid resin (e.g. a noncrystalline copolyester) so that the dispersoid resin can be caused to be uniformly dispersed while the light scattering performance of the dispersoid resin is maintained.

The refractive index of the compatibilizing agent (e.g. epoxidized block copolymer) may be approximately the same as that of the dispersoid resin (for example, the difference from the refractive index of dispersoid resin is about 0 to 0.01, and preferably about 0 to 0.005).

The epoxidized block copolymer mentioned above can be produced by epoxidizing a diene-series block copolymer (or a partially hydrogenated block copolymer) which has been prepared by the conventional method. The block copolymer can for example be prepared by polymerizing an aromatic vinyl monomer with a diene-series monomer in the presence of a lithium catalyst in an inert solvent [Japanese Patent Publication No. 23798/1965 (JP-40-23798B), Japanese Patent Publication No. 3252/1972 (JP-47-3252B), Japanese Patent Publication No. 2423/1973 (JP-48-2423B), Japanese Patent Application Laid-Open No. 33184/1976 (JP-51-33184A), Japanese Patent Publication No. 32415/1971 (JP-46-32415B), Japanese Patent Application Laid-Open No. 166518/1984 (JP-59-166518A), Japanese Patent Publication No. 36957/1974 (JP-49-36957B), Japanese Patent Publication No. 17979/1968 (JP-43-17979B), Japanese Patent Publication No. 32415/1971 (JP-46-32415B), Japanese Patent Publication No. 28925/1981 (JP-56-28925B), etc.]. The hydrogenated block copolymer may for example be prepared by hydrogenating a block copolymer with the aid of a hydrogenation catalyst in an inert solvent [Japanese Patent Publication No. 8704/1967 (JP-42-8704B), Japanese Patent Publication No. 6636/1968 (JP-43-6636B), Japanese Patent Application Laid-Open No. 133203/1984 (JP-59-133203A), etc.].

The epoxidization can be carried out in accordance with the conventional epoxidizing method, for example by epoxidizing the above-mentioned block copolymer with an epoxidizing agent (e.g. a peracid, a hydroperoxide, etc.) in an inert solvent. The peracid mentioned just above includes performic acid, peracetic acid, trifluoroperacetic acid, perbenzoic acid, etc. The hydroperoxide includes inorganic hydroperoxides (e.g. hydrogen peroxide) and organic hydroperoxides (e.g. t-butyl hydroperoxide). The hydroperoxide is used in combination with an acid or a metal catalyst in many cases, and the combination of tungstic acid-sodium hydroxide mixture with hydrogen peroxide, the combination of an organic acid with hydrogen peroxide, and the combination of molybdenum hexacarbonyl with t-butyl hydroperoxide can be mentioned as examples. The amount (level) to be used of the epoxidizing agent is not particularly restricted but can be broadly and judiciously selected according to the kind of block copolymer, the kind of epoxidizing agent, and expected degree of epoxidization (e.g. epoxy equivalent). The isolation and purification of the epoxidized diene-series block copolymer can be carried out by a suitable method, for example the method which comprises precipitating the copolymer with a poor solvent, the method which comprises adding the copolymer to hot water under stirring and removing the solvent by distillation, or the direct desolventization method (direct desolvation method).

The amount (level) to be used of the compatibilizing agent may be selected from the range of, for example, about 0.1 to 20 weight %, preferably about 0.5 to 15 weight %, and more preferably about 1 to 10 weight %, based on the total resin composition.

In the anisotropic scattering sheet, the preferred combination of continuous phase, dispersed phase and compatibilizing agent includes the combination of a continuous phase composed of a resin having high transparency and high thermal stability (e.g. a crystalline resin such as a crystalline polypropylene-series resin), a dispersed phase composed of a resin having high transparency, good thermal deformability and a fair degree of thermal stability (e.g. a noncrystalline (amorphous) resin such as a noncrystalline copolyester, a polystyrenic resin) and a compatibilizing agent comprising an epoxidized block copolymer.

In the anisotropic scattering sheet, the ratio of the continuous phase relative to the dispersed phase can be judiciously selected from the range of, for example, [former/latter (by weight)]=about 99/1 to 30/70 (e.g., about 95/5 to 40/60), preferably about 99/1 to 50/50 (e.g., about 95/5 to 50/50), and more preferably about 99/1 to 75/25, with reference to the kinds, melt viscosity and light diffusing properties of the resins.

In the preferred anisotropic scattering sheet, the relative amount of the continuous phase, dispersed phase and compatibilizing agent may for example be as follows.

(1) continuous phase/dispersed phase (weight ratio)=about 99/1 to 50/50, preferably about 98/2 to 60/40, more preferably about 90/10 to 60/40, and particularly about 80/20 to 60/40.

(2) dispersed phase/compatibilizing agent (weight ratio)= about 99/1 to 50/50, preferably about 99/1 to 70/30, and more preferably about 98/2 to 80/20.

When the components are used in such ratios, the dispersed phase can be uniformly dispersed even if pellets of each components are directly melt-kneaded together without compounding the components in advance but, with avoiding the formation of voids on orientation treatment, e.g. monoaxial stretching, and a light-scattering film of high transmittance can be obtained.

More specifically, for example, the following resin composition can be compounded readily, and the melt-molding can be carried out with compounding the raw materials only by feeding them, and the formation of voids can be prevented even when monoaxial stretching is carried out, as a result, an anisotropic diffusing film having high transmissivity can be obtained:

(a) a resin composition comprising a crystalline polypropylene-series resin as the continuous phase, a noncrystalline copolyester-series resin as the dispersed phase, and an epoxidized SBS (styrene-butadiene-styrene block copolymer) as the compatibilizing agent, in which a ratio of the continuous phase relative to the dispersed phase is 99/1 to 50/50 (particularly, 80/20 to 60/40) (weight ratio) and a ratio of the dispersed phase relative to the compatibilizing agent is 99/1 to 50/50 (particularly, 98/2 to 80/20) (weight ratio);

(b) a resin composition comprising a crystalline polypropylene-series resin as the continuous phase, a polystyrenic resin as the dispersed phase, and an epoxidized SBS as the compatibilizing agent, in which a ratio of the continuous phase relative to the dispersed phase is 99/1 to 50/50 (particularly, 90/10 to 70/30) (weight ratio) and a ratio of the dispersed phase relative to the compatibilizing agent is 99/1 to 50/50 (particularly, 99.5/0.5 to 90/10) (weight ratio).

In the anisotropic scattering sheet, particles forming the dispersed phase are each so configured that the ratio of the mean dimension L of the longitudinal or major axis to the mean dimension W of the minor axis (mean aspect ratio, L/W) is larger than 1 and the direction of the major axis of each particle coincides with the x-axis of the film. The preferred mean aspect ratio (L/W) may for example be about 2 to 1000, preferably about 5 to 1000, more preferably about 5 to 500 (e.g., 20 to 500), and usually about 50 to 500 (particularly 70 to 300). The morphology of dispersed phase particles may for example be a football-like (e.g. spheroidal), filamentous or cuboid. The larger the aspect ratio is, the higher is the anisotropy expressed in the scattering of light.

The mean dimension L of the major axis of the dispersed phase particle may for example be about 0.1 to 200 μm (e.g., about 1 to 100 μm), preferably about 1 to 150 μm (e.g., about 1 to 80 μm), particularly about 2 to 100 μm (e.g., about 2 to 50 μm), and usually about 10 to 100 μm (e.g., about 30 to 100 μm, particularly about 10 to 50 μm). The mean dimension W of the minor axis of the dispersed phase particle may for example be about 0.1 to 10 μm, preferably about 0.15 to 5 μm (e.g., about 0.5 to 5 μm), and more preferably about 0.2 to 2 μm (e.g., about 0.5 to 2 μm). The mean dimension W of the minor axis of the dispersed phase particle may for example be about 0.01 to 0.5 μm, preferably about 0.05 to 0.5 μm, and more preferably about 0.1 to 0.4 μm.

The orientation coefficient of dispersed phase particles may for example be not less than 0.7 (e.g., about 0.7 to 1), preferably about 0.8 to 1, and more preferably about 0.9 to 1. The higher the orientation coefficient is, the higher is the anisotropy imparted to scattered light.

The orientation coefficient can be calculated by means of the following equation.

$$\text{Orientation coefficient} = (3\langle\cos^2\theta\rangle - 1)/2$$

where θ represents the angle between the major axis of the particulate dispersed phase and the X-axis of the film or sheet (when the major axis is parallel to the X-axis, θ=0°); $\langle\cos^2\theta\rangle$ represents the average of $\cos^2\theta$ values found for individual dispersed phase particles and can be expressed as follows.

$$\langle\cos^2\theta\rangle = \int n(\theta)\cdot\cos^2\theta\cdot d\theta$$

(wherein n(θ) represents the percentage (weight percent) of dispersed phase particles having the angle θ in the total population of dispersed phase particles.)

Incidentally, the anisotropic scattering sheet may be provided with directionality of the diffused or scattered light. That a film has directionality means that, among the angles of intense scattering in anisotropic diffusion, there is an angle giving a maximum scattering intensity when the diffused light has directionality. Referring to the measuring system depicted in FIG. 5, when the diffused light intensity F is plotted against the diffusion angle θ, the curve of plots has a maximum or a shoulder (especially an inflection point such as a maximum) within a given range of diffusion angle θ (angles excluding θ=0°) when the diffused light has directionality.

For imparting the directionality to the anisotropic scattering sheet, the refractive index differential between the continuous phase matrix resin and the dispersed phase particles may for example be about 0.005 to 0.2, preferably about 0.01 to 0.1, and the mean dimension of the major axes of the dispersed phase particles may for example be about 1 to 100 μm, preferably about 5 to 50 μm. The aspect ratio may for example be about 10 to 300 (e.g., 20 to 300) and preferably about 50 to 200, and may be about 40 to 300.

The anisotropic scattering sheet may contain the conventional additives, for example stabilizers such as an antioxidant, an ultraviolet absorber, a heat stabilizer, etc.; a plasticizer, an antistatic agent, a flame retardant and a filler.

The thickness of the anisotropic scattering sheet is about 3 to 300 μm, preferably about 5 to 200 μm (e.g., about 30 to 200 μm), and more preferably about 5 to 100 μm (e.g., about 50 to 100 μm). Moreover, the total light transmittance of the anisotropic scattering sheet may for example be not less than 85% (85 to 100%), preferably about 90 to 100%, and more preferably about 90 to 95%.

Incidentally, the anisotropic scattering sheet may be a monolayered film comprising an anisotropic scattering layer singly, or may be a laminated film in which a transparent resin layer is laminated on at least one side (particularly, both sides) of the anisotropic scattering layer. When the anisotropic scattering layer is protected by the transparent resin layer, the dispersed phase particle can be prevented from falling out or sticking to improve flaw or scratch resistance of the film or stability in the film-producing process, and strength or handling of the film can be improved.

The resin constituting the transparent resin layer can be selected from the resins exemplified as the resins constituting the continuous phase or the dispersed phase. It is preferred that the transparent resin layer is composed of the same kind of resins (in particular, the same resin) as one constituting the continuous phase.

The preferred transparent resin for enhancing heat resistance or blocking resistance includes a resin having heat resistance (e.g. a resin having high glass transition temperature or melting point), a crystalline resin and the like. The glass transition temperature or melting point of the resin constituting the transparent resin layer may be the same degree as that of the resin constituting the continuous phase, and may be, for example, about 130 to 280° C., preferably about 140 to 270° C., and more preferably about 150 to 260° C.

The thickness of the transparent resin layer may for example be similar to that of the anisotropic scattering sheet. In particular, when the thickness of the anisotropic light-scattering layer is about 3 to 300 μm, the thickness of the transparent resin layer can be selected from the range of about 3 to 150 μm.

The thickness ratio of the anisotropic scattering layer relative to the transparent resin layer may, for example, be the anisotropic scattering layer/the transparent resin layer= about 5/95 to 99/1, preferably about 50/50 to 99/1, and more preferably about 70/30 to 95/5. The thickness of the laminated film is, for example, about 6 to 600 μm, preferably about 10 to 400 μm, and more preferably about 20 to 250 μm.

On the surface of the anisotropic scattering sheet, the releasing agent such as silicone oil may be applied or the treatment by corona discharge may be given or applied, as far as the optical properties of the film is not deteriorated.

Incidentally, the anisotropic scattering sheet may be formed with surface irregularities (or concave-convex sites) extending along X-axial direction of the film (the major direction of the dispersed phase). The formation of such surface irregularities imparts a higher degree of anisotropy to the film.

[Process for Producing the Anisotropic Scattering Sheet]

The anisotropic scattering sheet can be obtained by dispersing and orienting a dispersed phase-forming component (resin component, fibrous component, etc.) in a continuous phase-forming resin. For example, the dispersoid component can be dispersed by the method which comprises blending the continuous phase-forming resin with the dispersoid-forming component (resin component, fibrous component, etc.) in the conventional manner (e.g. melt-blending method, tumbler method, etc.) where necessary, melt-mixing them, and extruding the molten mixture from a T-die, a ring die, or the like into a film form. The orientation of the dispersed phase can be achieved by, for example, (1) the method comprising drafting (or drawing) the extruded sheet to form the sheet in the course of extrusion, (2) the method comprising stretching the extruded sheet monoaxially, or (3) a combination of the methods (1) and (2). The light-scattering film can also be obtained by (4) the method which comprises mixing the materials (melt-kneading components) together in solution and forming the anisotropic scattering sheet by use of the mixture by, for example, a casting method.

The melting temperature is not lower than the melting points of the resins (continuous phase resin, dispersed phase resin), for example about 150 to 290° C., and preferably about 200 to 260° C. The draw ratio (draft) may be for example about 2 to 40, preferably about 5 to 30, and more preferably about 7 to 20. Incidentally, the draw ratio may for example be about 5 to 80, preferably about 10 to 60, and more preferably about 20 to 40. The stretching factor (multiples) may for example be about 1.1 to 50 (e.g. about 3 to 50), and preferably about 1.5 to 30 (e.g. about 5 to 30).

When the drawing and stretching are conducted in combination, the draw ratio may for example be about 2 to 10, preferably about 2 to 5, and the stretching factor may for example be about 1.1 to 20 (e.g. about 2 to 20), and preferably about 1.5 to 10 (e.g. about 3 to 10).

In order to enhance the aspect ratio of the dispersed phase easily, the technologies include the method of subjecting the film (for example, a film-formed (extruded or cast) and cooled film) to monoaxial stretching. The method for monoaxial stretching is not particularly restricted but includes the method in which both ends of a solidified film are pulled in opposite directions (pull stretching), the method using two or more pairs of opposed rollers (2-roll sets) arranged serially (e.g. in a series of 2 pairs) wherein the film is passed over the rollers constituting each roll set by guiding it through the respective roll nips and stretched by driving the 2-roll set on the pay-out side at a speed higher than the speed of the 2-roll set on the feed side (inter-roll stretching), and the method in which the film is passed through the nip of a pair of opposed rollers and stretched under the roll pressure (roll calendering).

The preferred monoaxial stretching technology includes methods which facilitate the mass production of film, such as inter-roll stretching and roll-calendering. These methods are utilized as a first stretching step for producing a biaxial stretched film or a method for producing a phase film. Particularly, by roll calender method, not only a noncrystalline resin but also a crystalline resin can be easily stretched. Thus, when a resin sheet is stretched monoaxially, usually the trouble of "neck-in", the phenomenon of local reduction in the thickness and width of the film, tends to occur. In the roll calender method, however, the trouble of "neck-in" can be precluded so that the film stretching operation is stabilized. Since there is no change (reduction) in film width before and after stretching and the film thickness in the transverse direction can be made uniform so that the light-scattering characteristic can be uniformized in the transverse direction of the film, the quality assurance of the product be facilitated, and the useful rate (yield) of the film be improved. Furthermore, the stretching factor can be freely selected from a broad range. In addition, in roll calendering method, wherein the film width can be maintained before and after stretching, the reciprocal of the rate of reduction in film thickness is approximately equal to the stretching factor.

The roll pressure for roll calendering may for example be about $1 \times 10^4$ to $1 \times 10^7$ N/m (about 0.01 to 10 t/cm), and preferably about $1 \times 10^5$ to $1 \times 10^7$ N/m (about 0.1 to 10 t/cm).

The stretching factor can be selected from a broad range and may for example be about 1.1 to 10, preferably about 1.3 to 5, more preferably about 1.5 to 3. The roll calendering can be carried out at a thickness reduction rate (draft) of about 0.9 to 0.1, preferably about 0.77 to 0.2, more preferably about 0.67 to 0.33.

The stretching temperature is not particularly restricted inasmuch as the film can be stretched and may be over the melting point or glass transition point of the dispersoid resin (dispersed phase resin). Moreover, when a resin having a glass transition point or melting point higher than that of the dispersoid resin (for example, a resin having a Tg or melting point higher by about 5 to 200° C., preferably about 5 to 100° C.) is used as the continuous phase-forming resin and the film is monoaxially stretched while the dispersoid resin is melted or softened, the aspect ratio of the dispersed phase particles can be increased because the dispersoid resin is by far readily deformed as compared with the continuous phase resin so that a film having a particularly large anisotropy of light scattering can be obtained. The preferred stretching temperature may for example be about 100 to 200° C. (about 110 to 200° C.), and preferably about 110 to 180° C. (about 130 to 180° C.). The calender roll temperature, in case the continuous phase resin is a crystalline resin, maybe below the melting point of the resin or in the neighborhood of the melting point and, in case the continuous phase resin is a noncrystalline resin, maybe a temperature below the glass transition point and in the neighborhood of the glass transition point.

Incidentally, the above-mentioned laminated film can be obtained by using a conventional method such as a co-extrusion and a lamination (e.g., a lamination by extruding, a lamination with adhesives) which comprises laminating the transparent resin layer on at least one side of the anisotropic scattering layer and orientating the dispersed phase particle by the orientation-treatment in the same manner as mentioned above.

INDUSTRIAL APPLICABILITY

According to the present invention, use of a light-scattering sheet having an anisotropic scattering characteristic enables to illuminate a display panel uniformly even when a plane or flat light source unit or a display apparatus (e.g., a liquid crystal display apparatus) comprises a tubular light source having an anisotropic emission distribution (luminance distribution). That is, the sheet of the present invention suppresses the deterioration of the luminance depending on an angle relative to a display surface of a display apparatus or device (in particular, a transmittable display apparatus such as a transmittable liquid crystal display apparatus) and decreasing an angle dependence on the luminance. Moreover, the sheet of the present invention enables to simplify the structure of a plane or flat light source unit and a display apparatus or device (e.g., a liquid crystal display apparatus), and illuminates a display panel uniformly to realize clear visual recognition of a display data. Furthermore, the sheet of the present invention ensures expansion or enlargement of a visual angle relative to a display surface and visual recognition the display surface with high luminance.

Furthermore, a combination of an anisotropic scattering sheet with a prism sheet insures inhibition of the deterioration of the luminance depending on an angle relative to a display surface of a display apparatus (e.g., a transmittable display apparatus such as a transmittable liquid crystal display apparatus) and improvements in viewing angle properties. Moreover, the sheet of the present invention enables to expand or enlarge the viewing angle (particular, a viewing angle in a certain direction) relative to a display surface and to recognize the display surface visually with high luminance. Furthermore, the sheet of the present invention is capable of suppressing the deterioration of the luminance in the certain direction even when an angle of a display surface exceeds 20°. Thus, the transmittable liquid crystal display apparatus can be utilized without effecting eyestrain.

EXAMPLES

The following examples illustrate the present invention in further detail without defining the scope of the invention.

The characteristics of the anisotropic scattering sheet, the plane or flat light source unit comprising (or using) the sheet and the transmittable liquid crystal display apparatus comprising (or using) the sheet in the examples and comparative example were evaluated by the following methods.
[Anisotropy]

Using the measuring system illustrated in FIG. 5, the intensity F of scattered light at the scattering angle θ was measured. The orientating or stretching direction of the anisotropic scattering sheet was designated as X-axial direction and the direction perpendicular to this direction was designated as Y-axial direction.
[Luminance of Plane or Flat Light Source Unit]

Figure 6:
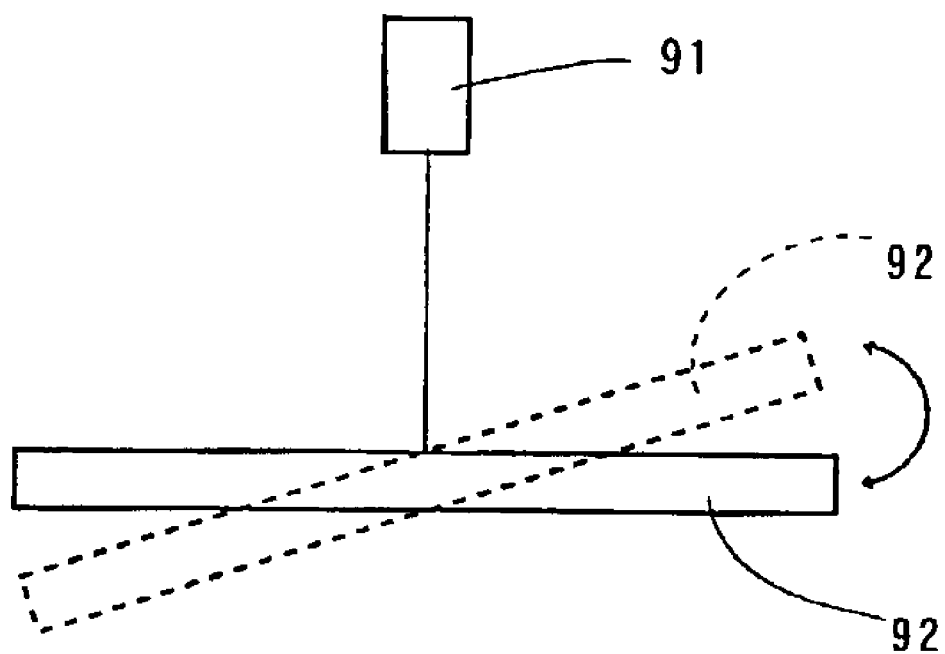
FIG. 6 is a schematic view illustrating a method for measurement of angle dependence on the luminance of the plane light source unit and a transmittable liquid crystal display apparatus comprising the light source unit.

For a backlight unit removed from a transmittable liquid crystal display apparatus and for a backlight unit comprising an anisotropic scattering sheet instead of a protective sheet of the removed backlight unit, the angle dependence on the luminance in the lateral direction (horizontal direction) was measured by disposing a luminance meter 91 (manufactured by MINOLTA Co., Ltd, LS-110) on the front of a backlight unit 92 (manufactured by Mitsubishi Electric Co., Diamond Crysta RD152A), as shown in FIG. 6. The angle dependence was measured by rotating the backlight unit 92 at a given angle.
[Luminance of Transmittable Liquid Crystal Display Apparatus]

For a transmittable liquid crystal display apparatus without the anisotropic scattering sheet, and for a transmittable liquid crystal display apparatus comprising the anisotropic scattering sheet as shown FIG. 4, the angle dependence on the luminance in the lateral direction (horizontal direction) was measured by disposing a luminance system as shown FIG. 6 on the front of the transmittable liquid crystal display apparatus.

Example 1

As the continuous phase resin, 60 parts by weight of crystalline polypropylene-series resin PP (manufactured by Grand Polymer Co.; F109BA, refractive index 1.503); as the dispersed phase resin, 36 parts by weight of noncrystalline copolyester-series resin (PET-G, manufactured by Eastman Chemical Company; Eastar PETG GN071, refractive index 1.567); and as the compatibilizing agent, 4 parts by weight of epoxidized diene-series block copolymer resin (manufactured by Daicel Chemical Industries, Ltd.; Epofriend AT202; styrene/butadiene 70/30 (by weight), epoxy equivalent 750, refractive index about 1.57) were used. The refractive index differential between the continuous phase resin and the dispersed phase resin was 0.064.

The above continuous phase resin and dispersed phase resin were dried at 70° C. for about 4 hours, and kneaded these resins in a Banbury mixer. Using an extruder of multi-layered type, the kneaded product for forming a center or intermediate layer and the continuous phase resin (polypropylene-series resin) for forming a surface layer were respectively melted at about 240° C. and extruded from a T-die with a draw ratio of about 3 onto a cooling or chilling drum of a surface temperature of 25° C. to laminate 25 $\mu$m of the surface layer (a transparent resin layer) on both sides of 200 $\mu$m of the center layer for obtaining a laminated sheet having three-layered structure (250 $\mu$m-thick). Observation of the center layer by transmission electron microscopy (TEM) revealed that the dispersed phase in the center layer was dispersed or distributed from in the form of approximate sphere-like (suborbicular) (the aspect ratio of about 1 and the average particulate size of about 5 $\mu$m) to in the form of rugby ball-like configuration having a small aspect ratio (the aspect ratio of about 4, the dimension of the major axis of about 12 $\mu$m, and the dimension of the minor axis of about 3 $\mu$m).

This sheet was monoaxially stretched by the roll calendering method (125° C., stretching factor of about 2 times (thickness reduction rate of about ½), width reduction rate of about 3%) to obtain a 125 $\mu$m-thick film. Observation of this film by TEM (dyeing with osmic acid) revealed that the dispersed phase of the canter layer was shaped like a highly elongated fiber, with a mean major axis dimension of about 30 $\mu$m and a mean minor axis dimension of about 1.5 $\mu$m.

Figure 7:
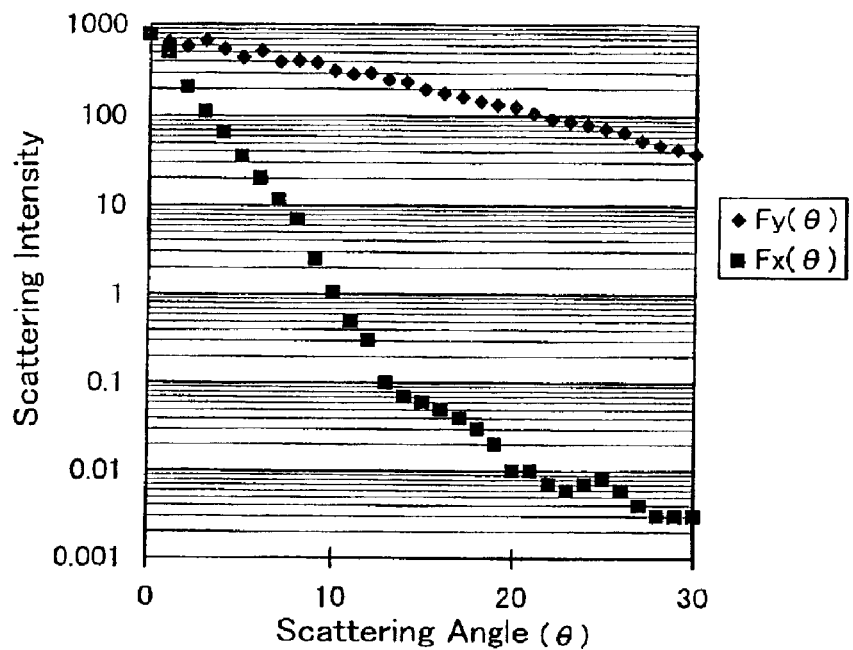
FIG. 7 is a graph showing an intensity of scattered light as measured with the film according to Example 1.
Figure 8:
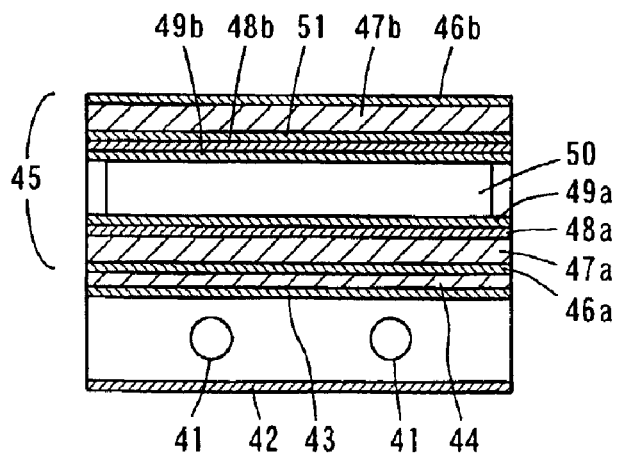
FIG. 8 is a schematic cross-section view showing a conventional transmittable liquid crystal display apparatus.
Figure 9:
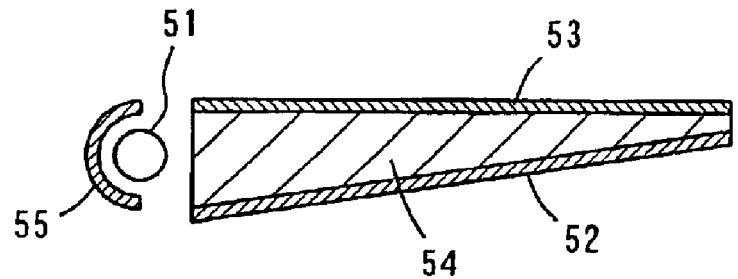
FIG. 9 is a schematic cross-section view showing a backlight system for use in a transmittable liquid crystal display apparatus.
Figure 10:
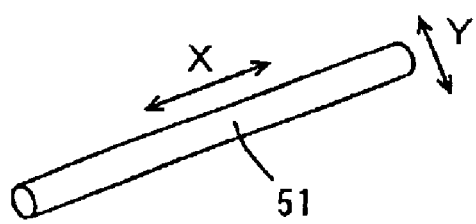
FIG. 10 is a schematic perspective view of a tubular light source.
Figure 11:
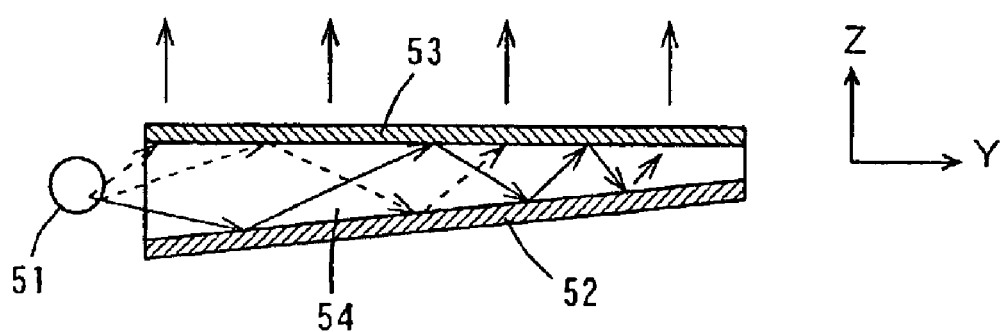
FIG. 11 is schematic cross-section view illustrating the emission distribution of the backlight system.

By measurement of the light-scattering characteristic of thus obtained anisotropic scattering sheet, remarkable light-scattering anisotropy was obtained as shown in FIG. 7. Moreover, in the light-scattering characteristic, Fy(4°)/Fx (4°) was 8.2. With respect to the scattering in the Y-axial direction showing intense scatter, Fy(0°)/Fy(30°) was 20.6 and the scatter was observed in the wide angle.

A liquid crystal cell unit was removed from a commercially available 15 inches-transmittable liquid crystal display apparatus to disassemble. The display apparatus was composed of a diffusing sheet, a prism sheet and a protective sheet which were disposed on a light guide of a backlight unit initially. As shown in FIG. 4, the anisotropic scattering sheet was disposed instead of the protective sheet in such a direction as the main scattering direction of the anisotropic scattering sheet (X-direction) is directed to the lateral direction (horizontal direction) to obtain a backlight (plane or flat light source unit) without a liquid crystal cell. The angle dependence on the luminance (but in the horizontal direction) was measured for the backlight by the method as shown in FIG. 6. Incidentally, concerning the uniformity of the luminance, N(0°)/N(18°) and N(18°)/N(40°) were calculated as the luminance of the front side (N(0°)) was 1.

Comparative Example 1

A liquid crystal cell unit was removed from the commercially available 15 inches-transmittable liquid crystal display apparatus to disassemble. The angle distribution on the luminance was measured by using the removed backlight unit singly in the same manner as Example 1. The light-scattering characteristic of the protective sheet disposed on the backlight unit was measured by the method as shown in FIG. 5 in the same manner as Example 1. As a result, no anisotropy of the scattering was observed and Fy(4°)/Fx(4°) was 1.0. Regarding the scattering in the lateral direction (horizontal direction), the scattering intensity in the wide angle was small, and Fy(0°)/Fy(30°) showed a large value (1,000).

Example 2

The above continuous phase resin and dispersed phase resin were melt-molded in the same manner as Example 1, and extruded from a T-die at a draw ratio of about 6 onto a cooling drum having a surface temperature of 25° C. The total thickness of the obtained sheet was 125 µm, and an anisotropic scattering sheet was composed of a light-scattering layer as the center layer having a thickness of about 100 µm and surface layers formed by a continuous phase resin on both sides the scattering layer and each having about 12.5 µm thickness.

Observation of the micro-structure of thus obtained sheet in the same manner as Example 1 revealed that the dispersed phase of the center layer showed like an elongated fiber, with a mean major axis dimension of about 15 µm and a mean minor axis dimension of about 2 µm. Measurement of the light-scattering characteristic of thus obtained anisotropic scattering sheet revealed that Fy(4°)/Fx(4°) was 2.4, with respect to the scattering in Y-axial direction showing considerable scattering, Fy(0°)/Fy(30°) was 8.4 which presents the wide angle scattering, though the light-scattering characteristic was smaller compared with Example 1.

Example 3

An original sheet having a three-layered structure for roll-calendering was produced in the same manner as in Example 1. The sheet was monoaxially stretched by the roll calendering method (125° C., stretching factor of about 2.5 times (thickness reduction rate of about 0.4), width reduction rate of about 3%) to obtain a 100 µm-thick film. Observation of the micro-structure of the sheet in the same manner as in Example 1 revealed that the dispersed phase of the center layer had a highly elongated fiber, with a mean major axis dimension of about 40 µm and a mean minor axis dimension of about 1.3 µm.

Example 4

As the continuous phase resin, 80 parts by weight of a crystalline polypropylene-series resin PP (manufactured by Grand Polymer Co.; F133, refractive index 1.503); as the dispersed phase resin, 18 parts by weight of a polystyrenic resin GPPS (general-purpose polystyrenic resin, manufactured by Daicel Chemical Industries, Ltd., GPPS #30, refractive index 1.589); and as the compatibilizing agent, 2 parts by weight of an epoxidized diene-series block copolymer resin (manufactured by Daicel Chemical Industries, Ltd.; Epofriend AT202; styrene/butadiene=70/30 (by weight), epoxy equivalent 750, refractive index about 1.57) were used. The refractive index differential between the continuous phase resin and the dispersed phase resin was 0.086.

A sheet having a three-layered structure was produced in the same manner as in Example 1. Observation of the micro-structure of the sheet in the same manner as in Example 1 showed that the dispersed phase of the center layer had an elongated fiber configuration, with a mean major axis dimension of about 20 µm and a mean minor axis dimension of about 1.6 µm.

Example 5

The anisotropic scattering sheet obtained by Example 1 was disposed on the backlight in the same manner as in Example 1, and the liquid crystal cell was rebuilt into the apparatus to obtain a transmittable liquid crystal display apparatus. The device was driven or operated, and the angle dependence on the luminance was measured in the same manner as in Example 1 with white color display.

Comparative Example 2

A commercially available transmittable liquid crystal unit was turned into white color display without altering the display condition, and the angle dependence on the luminance was measured in the same manner as in Example 1.

The anisotropic scattering characteristics of the films obtained by Examples and Comparative Examples, as well as the angle dependence on the luminance for the backlight and at the display condition of the liquid crystal display apparatus were evaluated. The results are shown in Table 1.

Moreover, FIG. 7 shows the anisotropic scattering characteristic of the film obtained by Example 1. Incidentally, visibility from the inclined direction was evaluated according to the following criteria.

A: the display can be visually recognized clearly (or finely) when the display is looked in or at the inclined horizontal direction relative to the front surface B: the display is recognized visually when the display is looked in or at the inclined horizontal direction relative to the front surface C: it is difficult to recognize the display visually when the display is looked in or at the inclined horizontal direction relative to the front surface

TABLE 1

| | Scattering characteristic | | Visibility from the inclined | Luminance N(θ) | | | Luminance ratio N(θ)/N(θ) | |
|---|---|---|---|---|---|---|---|---|
| | Fy(4)/Fx(4) | Fy(0)/Fy(30) | direction | θ = 0° | θ = 18° | θ = 40° | N(0)/N(18) | N(18)/N(40) |
| Ex. 1 | 8.2 | 20.6 | A | 1.20 | 1.21 | 1.29 | 0.99 | 0.94 |
| Com. Ex. 1 | 1 | 1000 | C | 1 | 0.91 | 0.71 | 1.10 | 1.28 |
| Ex. 2 | 2.4 | 8.4 | A | 1.31 | 1.36 | 1.36 | 0.96 | 1.00 |
| Ex. 3 | 81 | 111 | B | 1.25 | 1.28 | 1.21 | 0.98 | 1.05 |
| Ex. 4 | 3.0 | 11.2 | B | 1.58 | 1.61 | 1.68 | 0.98 | 0.96 |
| Ex. 5 | 8.2 | 20.6 | A | 0.54 | 0.55 | 0.58 | 0.99 | 0.94 |
| Com. Ex. 2 | 1 | 1000 | C | 0.45 | 0.41 | 0.32 | 1.09 | 1.28 |

It is apparent from Table that the sheets according to Examples have high anisotropy as compared with the sheets prepared by Comparative Examples. Thus, in case of employing the sheets according to Examples for a backlight unit, the angle dependence can be reduced, and the deterioration of the luminance is inhibited even when the display is looked in the inclined direction.

Regarding the evaluation for the liquid crystal display apparatus, as shown in Example 5 of Table 1, since the liquid crystal cell adsorbs about half amount of alight, the total luminance was deteriorated. However, the uniformity of the luminance was equal to Example 1. Moreover, even when the display was looked in the inclined direction, the prominent change in brightness was not observed as same as Example 1. On the other hand, as apparent from Comparative Example 2 of Table 1, the conventional liquid crystal display apparatus deteriorated the luminance wholly and, as in the case with Comparative Example 1, showed a larger value of the luminance ratio than Example 1, and when the display was looked in the inclined direction, the prominent changes in brightness observed with decreasing the prominent deterioration in the luminance as the inclined angle was larger.

What is claimed is:

1. An anisotropic scattering sheet adapted to scatter an incident light in a light-advancing direction and having a light-scattering characteristic F(θ) satisfying the following expression representing a relation between a light-scattering angle θ and a scattered light intensity F over a range of θ=4 to 30°:

$$Fy(\theta)/Fx(\theta)>2$$

wherein Fx(θ) represents the light-scattering characteristic in a direction of an X-axis and Fy(θ) represents a light-scattering characteristic in a Y-axial direction which is perpendicular to the X-axial direction;

wherein the light-scattering characteristic Fy(θ) is decreased gradually with increasing the light-scattering angle θ and wherein the light-scattering characteristic satisfies the following expression representing the relation between the light-scattering angle θ and the scattered light intensity F over a range of θ=0 to 30°: 10<Fy(0°)/Fy(30°)<150; and wherein the sheet is composed of a continuous phase comprising a crystalline resin and a dispersed phase particle comprising a noncrystalline resin. which phases are different in refraction index by not less than 0.001 from each other, wherein the mean aspect ratio of the dispersed phase particles is larger than 1 and the major axes of the dispersed phase particles are oriented in the X-axial direction of the film.

2. An anisotropic scattering sheet according to claim 1, wherein the scattering characteristic Fx(θ) and the scattering characteristic Fy(θ) satisfy the following expression over a range of θ=4 to 30°:

$$Fy(\theta)/Fx(\theta)>5.$$

3. An anisotropic scattering sheet according to claim 1, adapted to scatter the incident light in the light-advancing direction and having the light-scattering characteristic F(θ) satisfying the following expression representing the relation between the light-scattering angle θ and the scattered light intensity F over a range of θ=2 to 30°:

$$Fy(\theta)/Fx(\theta)>5.$$

4. An anisotropic scattering sheet according to claim 3, wherein the scattering characteristic Fx(θ) and the scattering characteristic Fy(θ) satisfy the following expression over a range of θ=2 to 30°:

$$Fy(\theta)/Fx(\theta)>10.$$

5. An anisotropic scattering sheet according to claim 1, wherein the scattering characteristic satisfies the following expression over a range of θ=0 to 30°:

$$15<Fy(0°)/Fy(30°)<50.$$

6. An anisotropic scattering sheet according to claim 1, wherein the mean aspect ratio of the dispersed phase particles is 5 to 1000.

7. An anisotropic scattering sheet according to claim 1, wherein the mean dimension of the minor axes of the dispersed phase particles is 0.1 to 10 μm.

8. An anisotropic scattering sheet according to claim 1, wherein the thickness of the sheet is 3 to 300 μm and the total light transmittance of the sheet is not less than 85%.

9. An anisotropic scattering sheet according to claim 1, wherein the ratio of the continuous phase relative to the dispersed phase is (the continuous phase/the dispersed phase)=99/1 to 50/50 (weight ratio).

10. An anisotropic scattering sheet according to claim 1, wherein the continuous phase comprises a crystalline polypropylene-series resin.

11. An anisotropic scattering sheet according to claim 1, wherein the dispersed phase comprises at least one member selected from a noncrystalline copolyester-series resin and a polystyrenic resin.

12. An anisotropic scattering sheet according to claim 1, wherein the sheet further comprises a compatibilizing agent for the continuous phase and the dispersed phase.

13. An anisotropic scattering sheet according to claim 12, wherein the compatibilizing agent comprises an epoxidized diene-series block copolymer.

14. An anisotropic scattering sheet according to claim 1, wherein the sheet comprises a crystalline polypropylene-series resin constituting a continuous phase, at least one resin selected from a noncrystalline copolyester-series resin and a polystyrenic resin, which constitute a dispersed phase, and an epoxidized diene-series block copolymer constituting a compatibilizing agent, and wherein the ratio of the continuous phase relative to the dispersed phase is (former/latter)=99/ 1 to 50/50 (weight ratio), and the ratio of the dispersed phase relative to the compatibilizing agent is (former/latter)=99/1 to 50/50 (weight ratio).

15. An anisotropic scattering sheet according to claim 1, wherein the sheet is formed with surface irregularities extending in the direction of the X-axis of the film or the major axis of the dispersed phase.

16. A display apparatus, which comprises a display unit, and a plane light source unit recited in claim 1 for illuminating the display unit.

17. A display apparatus according to claim 16, wherein the display unit comprises a transmission type unit.

18. A display apparatus according to claim 16, wherein the display unit is a liquid crystal display unit.

19. A display apparatus according to claim 16, an anisotropic scattering sheet is disposed in such a direction that a main light-scattering direction of the sheet is addressed or directed to the horizontal direction of the display surface of the display unit.

20. A plane light source unit, comprising:

a tubular light source;

a light guide member for being incident a light emitted by the tubular light source from the lateral side of the light guide member and emerging the light from an emerge surface; and at least one anisotropic scattering sheet interposed between the light guide member and a display unit for illuminating the display unit uniformly by the light from tubular light source, wherein said anisotropic scattering sheet comprises an anisotropic scattering sheet having a light-scattering characteristic recited in claim 1.

21. A plane light source unit according to claim 20, wherein the unit comprises a plurality of anisotropic scattering sheets composed of a continuous phase and a dispersed phase which are different in refraction index from each other, the dispersed phase is dispersed in the continuous phase and the mean aspect ratio of the dispersed phase is larger than 1, and wherein the plurality of anisotropic scattering sheets are disposed between the light guide member and the display unit with orienting different light-scattering directionality from each other.

22. A plane light source unit according to claim 21, wherein two anisotropic scattering sheets are disposed between the light guide member and the display unit with addressing or directing the major axes of the dispersed phase to a perpendicular direction each other.

23. A plane light source unit according to claim 20, wherein the anisotropic scattering sheet comprises a continuous phase and a dispersed phase which differ in refraction index by not less than 0.001, the mean aspect ratio of the dispersed phase is larger than 1 and the major axis of the dispersed phase is oriented in th axial-direction of the tubular light source.

24. A plane light source unit according to claim 20, wherein assuming that the axis-direction of the tubular light source is X-axial direction, the anisotropic scattering sheet is disposed in such manner that a main light-scattering direction along th Y-axial direction is perpendicular to the axial-direction of the tubular light source.

25. A plane light source unit according to claim 20, which comprises an isotropic diffusing sheet interposed between the light guide member and the display unit, a prism sheet, and an anisotropic scattering sheet having a light-scattering characteristic recited in claim 1.

26. A plane light source unit according to claim 25, wherein the anisotropic scattering sheet is positioned at the front side of the prism sheet.

27. A plane light source unit according to claim 20, wherein the tubular light source is disposed in almost parallel with and adjacent to the lateral side of the light guide member, a refractive member is disposed at or on the back side of the light guide member for reflecting a light from the tubular light source to the display unit side, and the anisotropic scattering sheet is interposed between the light guide member and the display unit.

* * * * *